US009792583B2

(12) United States Patent
Perreault et al.

(10) Patent No.: US 9,792,583 B2
(45) Date of Patent: Oct. 17, 2017

(54) METHOD AND SYSTEM FOR INTEGRATED PROFESSIONAL CONTINUING EDUCATION RELATED SERVICES

(75) Inventors: Stephen G. Perreault, Brooklyn, NY (US); Stephanie J. Black, Grapevine, TX (US); Todd R. Denlinger, Leander, TX (US); Kenneth A. Koskay, Southlake, TX (US); Gregory J. Poirier, Pinckney, MI (US)

(73) Assignee: Thomson Reuters Global Resources Unlimited Corporation, Baar (CN)

( * ) Notice: Subject to any disclaimer, the term of this patent is extended or adjusted under 35 U.S.C. 154(b) by 569 days.

(21) Appl. No.: 12/837,709

(22) Filed: Jul. 16, 2010

(65) Prior Publication Data

US 2011/0055100 A1    Mar. 3, 2011

Related U.S. Application Data

(63) Continuation of application No. 12/584,130, filed on Aug. 31, 2009.

(51) Int. Cl.
| | |
|---|---|
| G06Q 30/00 | (2012.01) |
| G06Q 10/10 | (2012.01) |
| G06Q 20/10 | (2012.01) |
| G06Q 30/06 | (2012.01) |
| G06Q 50/20 | (2012.01) |

(52) U.S. Cl.
CPC .......... *G06Q 10/10* (2013.01); *G06Q 20/102* (2013.01); *G06Q 30/018* (2013.01); *G06Q 30/0601* (2013.01); *G06Q 50/205* (2013.01); *G06Q 50/2053* (2013.01); *G06Q 50/2057* (2013.01)

(58) Field of Classification Search
CPC .................. G06Q 30/0601; G06Q 30/018
USPC .................................... 705/26, 27
See application file for complete search history.

(56) References Cited

U.S. PATENT DOCUMENTS

| | | | |
|---|---|---|---|
| 6,368,110 B1* | 4/2002 | Koenecke et al. ............ 434/219 |
| 6,587,668 B1* | 7/2003 | Miller et al. .................. 434/350 |
| 6,961,714 B1* | 11/2005 | LeVine .......................... 705/51 |
| 6,988,239 B2* | 1/2006 | Womble .................. G09B 7/02 |
| | | | 434/323 |
| 2003/0115550 A1* | 6/2003 | Womble .................. G09B 7/02 |
| | | | 715/210 |
| 2003/0152904 A1* | 8/2003 | Doty, Jr. .................. G09B 7/00 |
| | | | 434/350 |
| 2006/0019222 A1* | 1/2006 | Lelito et al. .................. 434/118 |
| 2008/0005032 A1* | 1/2008 | Znidarsic ........................ 705/59 |

(Continued)

OTHER PUBLICATIONS

Business Wire: "WebCE Acquires Legal EdNet.com from Akin, Gump, Strauss, Hauer & Feld," Feb. 6, 2001, Proquest #67889368.*

(Continued)

*Primary Examiner* — Rob Pond
(74) *Attorney, Agent, or Firm* — Duncan Galloway Egan Greenwald, PLLC; Kevin T. Duncan

(57) ABSTRACT

Systems and techniques are disclosed that provide a comprehensive and integrated professional education and training platform, especially in the areas of tax, financial auditing and reporting, and planning and risk assessment. The systems and techniques allow an administrator to identify a subset of learning courses from a set of available learning courses for association with an educational product, and to assign individuals to each of the subset of learning courses.

18 Claims, 47 Drawing Sheets

(56) References Cited

U.S. PATENT DOCUMENTS

2008/0162274 A1* 7/2008 Newman ................ G09B 7/00
434/219
2008/0318197 A1* 12/2008 Dion ...................... G09B 7/00
434/322
2009/0254482 A1* 10/2009 Vadlamani ............ G06F 21/10
705/59

OTHER PUBLICATIONS

Thomson Tax & Accounting: "CPE & Training Solutions from Thomson Tax & Accounting," Internet Archive Wayback Machine, www.archive.org; http://trainingcpe.thomson.com; May, Aug. 2008; 10pgs.*

Baron, Jon: "Information At Your Fingertips," The Practical Accountant, Jun. 2006, ProQuest Dialog #208251198, 4pgs.*

Gold, Liz: "How do you want your CPE?" Accounting Today, v22i1, Jan. 7-28, 2008; ProQuest Dialog #234362341, 5pgs.*

Anonymous: "PPC: The Internet is one Key," Accounting Today, Dec. 2002, ProQuest Dialog #234381477, 3pgs.*

Stimpson, Jeff: Automating Workflow,: The Practical Accountant, v40i10, Oct. 2007,ProQuest Dialog #208252727, 11pgs.*

UU: Knighton et al.: "How Technology Enhances Governance Compliance," Financial Executive, v24i6, Jul.-Aug. 2008, ProQuest Dialog #208892980, 7pgs.*

V V: Schulz, Wayne: "Software That Puts It All Together," Accounting Today, 2006; ProQuest Dialog #234390023, 11pgs.*

* cited by examiner

CPE & Training Solutions from Thomson Tax & Accounting          Training | Support | Contact Us | My ACCOUNT

Welcome, Roy M. Martin, Jr.

| My CPE | My Bookshelf | My Favorite Experts | Web Chat | Other Solutions |

A default learning path has been designed for you based on your user preferences and any other requirements specified by your company. You can build and save additional learning paths to help you determine different career paths or other goals you are interested in.

Default Learning Path Criteria:

KPMG Required: Professional Conduct

Area of Practice: Accounting                    Area of Practice: Accounting

Training most interested in: Accounting         # of years of experience: Over 10

Preferred Media: Webinars  Print-Based          Other Designations: CFP

Practice Specialties: Accountant, Individual Tax, Ethics, Management

States requested: Alabama, California

---

Saved Learning Paths                                 Default Learning Paths
                                                     (based on your user profile)
10/21/2006  Becoming a Tax Specialist
11/30/2006  My path to Supervisor                    Build New Learning Path
12/20/2006  Building up to Manager

CPE & Training Solutions from Thomson Tax & Accounting          Training | Support | Contact Us | My ACCOUNT

Welcome, Roy M. Martin, Jr.

My CPE  |  My Bookshelf  |  My Favorite Experts  |  View Learning Path Criteria  |  Change Learning Path Criteria  |  Web Chat  |  Other Solutions Learning Path - complete within 1 year

1400

| Date Completed | Company | Course Title | Field of Study | Delivery Format | Credit Hours Earned | Status |
|---|---|---|---|---|---|---|
| n/a |  | Judicial Concepts of Taxation | Tax | Self-Study - Online | 1 hour | Not Started |
| 10/31/2006 | RIA | Getting Started with Checkpoint | Tax | Self-Study - Online | 2 hours | Completed |
| n/a | PPC | Staff Training 3 – Dev. Sup's and Mgrs | Professional Development | Instructor-Led | 16 hours | Not Started |
| 12/12/2006 |  | Income Tax Training 1040 Module 1 | Tax | Self-Study - Online | 9 hours | Not Started |
| 12/13/2006 |  | Ethics and Professional Conduct for CFP's | Ethics | Self-Study - Online | 2 hours | Completed |

You have completed 13% of your Learning Path Goal (4 of 30 hours)

FIGURE 14

| Appointment | Scheduling | | | |
|---|---|---|---|---|
| Subject: | PPC's Tax Library | | | |
| Location: | Internet-based Live | | Label: | ☐ None |
| Start time: | Mon 11/6/2006 | 4:00 PM | ☐ All day event | |
| End time: | Mon 11/6/2006 | 5:00 PM | | |
| ☑ Reminder: | 15 minutes | 🔔 | Show time as: ■ Busy | 1600 |

PPC's Federal Tax Compliance Library is designed especially for return preparers and reviewers to provide an integrated tax research product aimed at the needs of practitioners serving small businesses, individuals, estates, trusts, and nonprofits. Through the use of Deskbooks, PPC's Federal Tax Compliance Service on Checkpoint provides all of the benefits of the Checkpoint system, plus the expertise of the PPC editorial staff.

This course:
-Provides a basic overview of Checkpoint navigational elements as a tax research tool.
-Explains how to use simple keyword search strings to produce general or specific search results across multiple source libraries.

Contacts... | Categories... | Private

FIGURE 16

CPE & Training Solutions from Thomson Tax & Accounting     Training | Support | Contact Us | My ACCOUNT

Welcome, Roy M. Martin, Jr.

My CPE | My Bookshelf | My Favorite Experts | Web Chat | Other Solutions

1900

You have purchased the following courses, and have access to the following exams.

| Course | Description | Expires | Score | Hours | Attempts | Status |
|---|---|---|---|---|---|---|
| 02-003 | Estates & Trusts (1 Day) | 7/25/2007 | 31% | 20.00 | 2 | Retry |

1902

- Exams are available one year from the date you purchase the course.
- You may attempt the exam three times before you must purchase it again.
- You must score at least a 70% on each exam in order to receive CPE credit.

Roy, you need to complete this course plus another 20 hours to meet the minimum New York State Board of Accountancy CPE Requirements.

1906

Here are some recommended courses that you might consider.

| Course | Description | Hours | | | | |
|---|---|---|---|---|---|---|
| 02-009 | Federal Gift Tax | 10.00 | learn more about this course | | | |
| 02-017 | Generation Skipping Tax | 3.00 | learn more about this course | | | |
| 02-030 | New York State Ethics | 7.00 | learn more about this course | | | |

CPE & Training Solutions from Thomson Tax & Accounting    Training | Support | Contact Us | My ACCOUNT

Welcome, Roy M. Martin, Jr.

| My CPE | My Bookshelf | My Favorite Experts | Web Chat | Other Solutions |

You have purchased the following courses, and have access to the following exams.

| Course | Description | Expires | Score | Hours | Attempts | Status |
|---|---|---|---|---|---|---|
| 02-003 | Estates & Trusts (1 Day) | 7/25/2007 | 99% | 20.00 | 2 | Completed |
| 02-009 | Federal Gift Tax | 7/25/2007 | 90% | 10.00 | 1 | Completed |
| 02-017 | Generation Skipping Tax | 7/25/2007 | 79% | 3.00 | 2 | Completed |
| 02-030 | New York State Ethics | 7/25/2007 | 99% | 7.00 | 3 | Completed |

Total CPE hours: 40.00

2000

2002

Roy, Congratulations!
You have met the annual requirement for the New York Society of CPAs.

CPE & Training Solutions from Thomson Tax & Accounting   Training | Support | Contact Us | My ACCOUNT RIA            PPC      QuickFinder

COURSE LOADER

Welcome, Roy M. Martin, Jr.

Check all that apply    2202

☐ Load NASBA Compliant Questions
☐ Load Quizzers
☐ Load Practice Exam
☐ Extract Questions from Imported Content

Import Course Information

You may import any of these file types: .PDF, .DOC, .XLS, .XML

[_____] 2204 [Browse]

[Import]

To automatically generate questions from keywords found in the course materials, click Build Keyword Search.

[Build Keyword Search]

Results for: retirement  Documents: 9
$ = Less than $100   $$ = $100 - $199   $$$ = $200 and over   GU = Gear Up   MM = MicroMash

| Acronym | Product Name | Brand | Price | Print | Comp | ILT | Inhouse | Hours |
|---|---|---|---|---|---|---|---|---|
| Consulting ElderCare | | | | | | | | |
| RDGG | Planning for Retirement to Transfers at Death | GU | $$ | | | | | 8 |
| 06-ACD11004 | Planning for Retirement Transfers at Death Audio CD Program with Manual and CPE | GU | $$ | x | ◊ | | | 9 |
| 06-A11004 | Planning for Retirement Transfers at Death Audio Tape Program with Manual and CPE | GU | $$ | x | ◊ | | | 9 |
| 06-ME12004 | Planning for Retirement Transfers at Death Manual and CPE Exam (must be ordered along with recorded program) | GU | $ | | | | | 9 |
| Taxation Retirement Income Taxation | | | | | | | | |
| RETS | 2003-2004 Retirement Income Tax Update | MM | $ | | ◊ | | | 6 |
| IRAS | Individual Retirement Accounts(IRAs) | MM | $$ | | ◊ | | | 9 |
| RETI | Retirement Income Taxation | MM | $ | | ◊ | | | 6 |
| EXTA | Retirement Income Taxation - Advanced | MM | $ | | ◊ | | | 8 |

CPE & Training Solutions from Thomson Tax & Accounting        Training | Support | Contact Us | My ACCOUNT Welcome, Roy M. Martin, Jr.

| My CPE | My Bookshelf | My Favorite Experts | Web Chat | Other Solutions |

—1006

My Bookshelf of Course Materials

Taxes:
- Tax Update 2006  —2702
- IRA's and Pension rule changes for 2006
- Pension Protection Act of 2006 – Webinar PowerPoint Accounting:
- SOX Compliance Auditing:
- Assessing and Responding to Identified Risks: Detailed Audit Plan under the New Risk Assessment Standards

CHECKPOINT® LEARNING

Home | CPE Solutions | CPE Brands | Sales & Support | Course Finder | Online Grading | 🛒 Shopping Cart

Controller's and Practitioner's Business Tax Update
By Allan Boress, Arthur Berkowitz

Training/Solutions

Online Learning

Live Seminars & Conferences

In-House Training

Self Study Courses

Online Grading

Training & Brands

MicroMash

PASS Online

Required

Webinar Learning Network

Gear Up

Bell Learning (Gear Up Workshops)

PPC

Auditwatch

Quickfinder

RIA

Add. Resources

Noted Experts

CPE Compliance

Recent CPE Rule changes

More...

Marketing Description: This course summarizes the major provisions of new tax legislation, cases, and regulations examining their impact on, businesses, investments, and retirement plans. The emphasis is on strategic tax planning for business entities and planning opportunities. This presentation is designed to meet those needs by identifying features of recent developments having special meaning to the tax practitioner and return preparer. Practical solutions to problems of the general practitioner and tax planning will be emphasized.

Illustration/Graphic:

Course ID: CLQABA

Category: Taxation

NASBA Field of Study:

NASBA Registry/QAS Credits:

CPE Credits: 13

NASBA Delivery Method:

Other Certifications: 3300

Level: Basic

Learning Objectives: Show

Outline: Show

Pre-requisites: :General understanding of federal income taxation

Advanced Preparation: none

System Requirements: Controller's and Practitioner's Business Tax

Quick Search

Field of Study
Accounting and Auditing
Consulting
Information Technology
Management
Personal Development
Specialized Industries
Taxation
Yellow Book
Ethics

Delivery Format
In-House Training
Live Seminars and Conferences
Online Learning - Webinars
Online Learning - Self-Study
Self-Study - Print-based
Virtual Classroom (Webinars)

Thomson CPE Brands
Bell Learning
Gear Up
MicroMash
PASS Online
PPC
Quickfinder
RIA
Webinar Learning Network

```
welcome to                                              Main Menu|New User Toolkit|Options|Help|Logout
Checkpoint User Administration System
Edit Product "P10W" - "PICK 10 COURSES PACKAGE"

Product Name:            PICK 10 COURSES PACKAGE
Product Code:            P10W
Short Description:       PICK 10 PACK
Royalty Based Product:   ☐
Product Start Date:      12/05/2009  (MM/DD/YYYY)
Product Status:          Active ▼
Practice Areas:          Federal
                         State & Local
                         International
                         Pension & Benefits
Product Visibility:      Visible ▼
Package Types:           CheckPoint Learning ▼
Site Letter Type:        NO_LETTER ▼
Is Bundle:               Custom ▼
Courses Allowed:         10
Admin:                   ☐
Consumed:                ☑
Usage Based:             ☐
Account Level Assignment: ☐

[Update] [Reset] [Cancel]

Checkpoint

Version: CUAS:5.6 - Loadtime: 0.021 - Time: 06/07/2010 15:51:46 CDT     ©2010 Thomson Reuters All rights reserved
```

*FIG. 40*

| welcome to | | | | | | | | | Main Menu\|New User Toolkit\|Options\|Help\|Logout |
|---|---|---|---|---|---|---|---|---|---|

Checkpoint User Administration System

Product "P10W" - "PICK 10 COURSES PACKAGE"

| | |
|---|---|
| Product Name: | PICK 10 COURSES PACKAGE |
| Product Code: | P10W |
| Short Description: | PICK 10 PACK |
| Royalty Based Product: | Not Available |
| Product Start Date: | 12/05/2009 |
| Product Status: | Active |
| Practice Area: | Federal |
| Product Visibility: | Visible to Create Order |
| Application Name: | |
| Package Type: | Checkpoint Learning |
| Site Letter Type: | NO LETTER |
| Is Bundle: | Custom |
| Courses Allowed: | 10 |
| Admin: | No |
| Consumed: | Yes |
| Usage Based: | No |
| Account Level Assignment: | No |

Commands: [Edit | List ODS | Assign ODS | List OFS | Assign OFS | List Etool Bundle | Assign Etool Bundle | List CPL | Assign CPL | List CPL Bundle | Assign CPL Bundle]

Checkpoint

Version: CUAS:5.6 - Loadtime: 0.038 - Time: 05/08/2010 11:50:19 CDT          ©2010 Thomson Reuters All rights reserved

FIG. 41

*White and Black LLP* — Shopping Cart | Help | SIGN OFF

[Employees] [University] [Learning Paths] [Settings] [Support] [Resources] [Reporting]  [Course Finder]

Powered by Reqwired

Admin: Stephen Perreault

University Menu

- University
  - White & Black LLP
  - Thomson Reuters University
    - Thomson Reuters Retail Bundle
    - Chris' course
    - Kemper CPA Group Bundle
      - Edit Bundle Package Info
      - Edit Employee List
      - Edit Courses List
  - CPL STANDARD PACK
  - CPL PREMIUM PACK
  - CPL PREMIUM PACK Bundle Package Profile — White and Black LLP Bundle Package Information — Edit Bundle Package Information Name: Kemper CPA Group Bundle
Description: This is where Kemper will be able to customize the description of the bundle of courses to their professionals.
Comments: Please contact Brianna at x4733 if you have any questions or problems.
Subscription ID: 00241347403

Account Statistics

Bundle Seats
Total: 75
Occupied: 11
Empty: 64

Courses (Records: 1 thru 10 of 10)  Edit Course List

| Name | Format | Sponsor | NASBA Field Study/Credits |
|---|---|---|---|
| 1040 Deskbook: Form 1040 Supplemental Schedules C, F & E from PPC | Online (Self Study) | PASS Online | |
| Audit Update: SAS 113 and 114 | Online (Self Study) | Micromash | |
| C Corporations: Overview of Corporate Income Tax | Online (Self Study) | Micromash | |
| Car, Travel, and Entertainment and Home Office Deductions | Online (Self Study) | PASS Online | |
| Effective Writing for Accountants | Online (Self Study) | Micromash | |
| Execume - It's More Than a Resume | Online (Self Study) | PASS Online | |
| FASB Update | Online (Self Study) | Micromash | |
| How to Start a Business | Online (Self Study) | Micromash | |
| How to Write a Business Plan | Online (Self Study) | Micromash | |
| Individual Tax Overview | Online (Self Study) | Micromash | |

Assigned Employees (Records: 1 thru 11 of 11)  Edit Assigned Employee List

| Name | Title | Office | Practice | Status |
|---|---|---|---|---|
| Claeys, Diane | CSM | Fort Worth | Training | |
| Clark, Gary | CRE Inside Sales | Ft. Worth | Tax | A |
| Doyle, Nina | Associate | Ft. Worth | Tax | |
| Freeman, Chad | Associate | Fort Worth | Tax | |
| Hardgrove, Heather | Associate | Ft. Worth | Tax | |
| Kent, Clark | Audit Partner | New York | Audit | A |
| Medrano, Chris | Associate | Ft. Worth | Tax | |
| Nalepa, James | Inside Sales Rep | Fort Worth | BCKS | |
| Perreault, Stephen | Senior Director | New York | Professionals | |
| Wayne, Bruce | Partner | New York | Consulting | |
| Zadra, Cree | Associate | Fort Worth | Training | |

White and Black LLP

Shopping Cart | Help | SIGN OFF

[Employees] [University] [Learning Paths] [Settings] [Support] [Resources] [Reporting]    [Course Finder]

Powered by Reqwired

Admin: Stephen Perreault

University Menu

- University
  - White & Black LLP
  - Thomson Reuters University
    - Thomson Reuters Retail Bundle
    - Chris' course
    - Kemper CPA Group Bundle
      - Edit Bundle Package Info
      - Edit Employee List
      - Edit Courses List
  - CPL STANDARD PACK
  - CPL PREMIUM PACK
  - CPL PREMIUM PACK

Filter Employee List

Last Name: [A-Z]

Administrative Groups:
- D-Audit
- D-Consulting
- D-FTW CS Agents
- D-FTW Product Usage
- D-FTW TS Agents Filter Relationship: ○ And ● Or
Show members of no groups? ○ Yes ● No

[Filter] [Reset]

Assign Employees - Kemper CPS Group Bundle    White and Black LLP

Account Statistics
Bundle Seats
Total: 75
Occupied: 11
Empty: 64

Employee List (Records: 1 thru 50 of 110) > >>

| | Name | Title | Office | Practice | Status |
|---|---|---|---|---|---|
| ☐ | Allen, Barry | Partner | Los Angeles | Tax | |
| ☐ | Anderson, Brianna | Partner | Rockville | Training | |
| ☐ | Apelt, Ruth | Field Sales | Rockville | Tax | |
| ☐ | Apples, Annie | CPA | Dallas | Tax | |
| ☐ | Bizego, Elizabeth | Associate | Fort Worth | FTW CS Agent | |
| ☐ | Black, Stephanie | Manager | Ft. Worth | Tax | |
| ☐ | Bojda, Karen | Associate | Rockville | Audit | |
| ☐ | Booth, Barbara | Partner | New York | FTW Product Usage | |
| ☐ | Bostick, Albert | Associate | Rockville | Audit | |
| ☐ | Brant, Lynelle | Associate | Field Sales | Tax | |
| ☐ | Brooks, Susan | Manager | Fort Worth | FTW TS Agents | |
| ☐ | Brumage, Matt | Associate | Ft. Worth | Audit | |
| ☐ | Buescher, Karen | CSM | Fort Worth | Training | |
| ☐ | Buller, Michelle | CSM | Fort Worth | Training | |
| ☐ | Claeys, Diane | CSM | Fort Worth | Training | |
| ☐ | Clark, Gary | CPE Inside Sales | Ft. Worth | Tax | 🔒 |
| ☐ | Conroy, Wendy | CSM | Fort Worth | Training | |
| ☐ | Cook, Dan | Manager | Fort Worth | FTW TS Agents | |
| ☐ | Cooper, Mark | CSM | Fort Worth | Training | |
| ☐ | Davis, Terry | Partner | Atlanta | Tax | |
| ☐ | Denlinger, Todd | | | | |
| ☐ | Doyle, Nina | Associate | Ft. Worth | Tax | |
| ☐ | DuBois, Rebecca | Associate | Fort Worth | FTW CS Agents | |
| ☐ | Dudley, Bob | Partner | Enterprise | Tax | |
| ☐ | Dulaney, Karen | Manager | Forth Worth | FTW TS Agents | |
| ☐ | Dyer, Sarah | Associate | Ft. Worth | Tax | |
| ☐ | Dyer, Sarah | Account Manager | | | |
| ☐ | Ebert, Misty | Associate | Ft. Worth | Tax | |

| Name | Sponsor | Format | NASBA Field Study/Credits | Expiration Date |
|---|---|---|---|---|
| 1040 Deskbook: Form 1040 Supplemental Schedules C, E & F from PPC | PASS Online | Online (Self-Study) | | 02/06/2011 |
| Audit Update: SAS 113 and 114 | Micromash | Online (Self-Study) | | 02/06/2011 |
| C Corporations: Overview of Corporate Income Tax | Micromash | Online (Self-Study) | | 02/06/2011 |
| Car, Travel and Entertainment and Home Office Deductions | PASS Online | Online (Self-Study) | | 02/06/2011 |
| Effective Writing for Accountants | Micromash | Online (Self-Study) | | 02/06/2011 |
| Execuse - It's More Than a Resume | PASS Online | Online (Self-Study) | | 02/06/2011 |
| FASB Update | Micromash | Online (Self-Study) | | 02/06/2011 |
| How to Start a Business | Micromash | Online (Self-Study) | | 02/06/2011 |
| How to Write a Business Plan | Micromash | Online (Self-Study) | | 02/06/2011 |
| Individual Tax Overview | Micromash | Online (Self-Study) | | 02/06/2011 |

White and Black LLP

Shopping Cart | My Profile | Help | SIGN OFF

Homeroom | Status Reports | Activity History | Schedule Learning | Settings | Resources | Course Finder | Online Grading | Checkpoint Powered by Reqwired Admin: Stephen Perreault

Schedule Learning Menu
- My Universities
- Schedule Learning
  - Live Learning
  - On-Demand Learning (Courses Available)
    - White & Black, LLP University
    - Thomson Reuters University
      - Thomson Reuters Retail Bundle
      - Chris' course
      - Kemper CPA Group Bundle
      - CPL PREMIUM PACK
- Course Catalogs
- Learning Plans
- Registrations/Waitlist/Instructor Commitments Search Course Activities

[        ] [Search]
Advanced Search

Search

Record Type
Course Activities will return records describing relevant learning opportunities (e.g., Live Seminars, Videotapes, etc.). With at least one of the following terms:
The search will return results where any of the search terms are found in the profiles of course activities. Search terms should be separated by commas.

Kemper CPA Group Bundle (Courses Available)

On-Demand Learning (Records: 1 thru 10 of 10)

© 2010 THOMSON REUTERS    THOMSON REUTERS

FIG. 47

METHOD AND SYSTEM FOR INTEGRATED PROFESSIONAL CONTINUING EDUCATION RELATED SERVICES

CROSS-REFERENCE TO RELATED APPLICATION

This application is a continuation-in-part of U.S. application Ser. No. 12/584,130, filed Aug. 31, 2009, the content of which is incorporated herein in its entirety.

FIELD OF THE INVENTION

The present invention relates to the provision of professional services and to related education products, services and tools. More particularly, the invention relates to an integration of services and products related to developing, delivering, monitoring and reporting continuing education courses and materials. The present invention relates to computer-implemented tools, resources, and processes for presenting, transacting, delivering and reporting for credit professional services-related education in conjunction with providing professional resource and reference materials and tools.

BACKGROUND OF THE INVENTION

As partnerships, companies and commercial entities continue to strive for efficiency, consistency and flexibility, computers and software executed on computers are increasingly relied upon to automate, semi-automate, enhance, quicken and make reliable and uniform business processes. This is true even in fields of professional service providers, such as financial auditors, certified public accountants, lawyers, doctors, etc. In addition, with ever increasing bandwidth and data storage capabilities and compression techniques, large quantities of data, including audio and video streaming, may be effectively communicated over networks such as the Internet for a wide range of services and purposes.

The invention has application in areas of professional education and professional accreditation, such as the series of certified public accountant "CPA" exams required by individuals prior to receiving professional designations, e.g., CPA, as well as continuing education required to maintain such designations in various national, international and state jurisdictions. Professional education is also critical to professional firms for the development of its employees and for maintaining a pool of skilled individuals well adapted to meet the needs of clients in professional engagements, such as audits and preparing tax related filings.

In the various fields of professional services there exist computer/network-based professional research and resource systems that provide professionals with tools and resources to better deliver professional services to clients and within an organization. Such delivery of professional services may be from without an organization, such as by professional services firms, like law firms and accounting firms, or it may be from within an organization, such as an internal audit department. Companies, such as Thomson Reuters Corporation and all of its affiliated companies (collectively "Thomson Reuters"), provide tools, resources and services to assist professionals, including lawyers, accountants and auditors in the practice of their respective profession. In the often overlapping areas of accounting, tax, financial reporting, internal compliance, and auditing, one such system is the CHECKPOINT® platform and in the area of legal services one such system is WESTLAW®, both offerings of Thomson Reuters.

CHECKPOINT is an online, browser-based, tax and accounting research service/platform used by professionals in providing tax and accounting related services to external clients or internally within organizations in the areas of internal auditing, planning, cost management, compliance, financial reporting, risk assessment and internal controls. CHECKPOINT may be used in conjunction with other products and services. CHECKPOINT research tools may be used with other software and tools and applied against guidance and content resources, such as the following software, tools, guidance and content: RIA®, PPC®, EBIA®, IBFD® and WG&L®, all offerings of Thomson Reuters. CHECKPOINT in conjunction with such tools and content may be employed to deliver, for example, guidance in areas of tax and accounting, employee benefits, etc., with delivery in the form of suggested auditing and other procedures, interactive checklists, links, e.g., hyperlinks, to content, questionnaires, uniform practice documentation, etc. CHECKPOINT provides professionals, such as accountants, financial managers, controllers, compliance officers and treasurers, with tax and accounting related content and resources including: expert editorial analysis from RIA, guidance from WG&L authors and PPC experts, and content from IBFD, EBIA and others sources. CHECKPOINT integrates content from RIA, WG&L, PPC, IBFD, EBIA and BNA® with primary sources from organizations including AICPA (American Institute of Certified Public Accountants), SEC (U.S. Securities and Exchange Commission), GAAP (Generally Accepted Accounting Principle/Procedure), FASB (Financial Accounting Standards Board), GASB (Governmental Accounting Standards Board), IASB (International Accounting Standards Board) and more. Users can search with customizable search options performed against customizable libraries and are presented with links to primary source materials and analysis, as well as workflow tools. CHECKPOINT delivers tax and accounting news to user inboxes and makes such information accessible online.

CHECKPOINT may also be used with tax, auditing, and compliance software, for instance Thomson Reuters' CS PROFESSIONAL SUITE® (including PRACTICE CS®, ENGAGEMENT CS®, ULTRATAX CS® and others), PPC's E-PRACTICE AIDS®, PPC's E-TOOLS®, PPC's SMART PRACTICE AIDS®, WG&L's E-TOOLS FOR INTERNAL AUDIT®, ONESOURCE®, GOSYSTEM®, GOTRACKER®, TAXSTREAM®, FAST-TAX®, E-FORM®, WORKPAPERS PLUS®, PPC'S ENGAGEMENT LETTER GENERATOR®, DISCLOSURE® and Interactive Disclosure Libraries. Using CHECKPOINT in conjunction with these related software, tools, and services enables users to more efficiently access and process large volumes of data, regulatory and other content and to deliver accounting, auditing, tax (federal, state and local, international), estate planning, payroll, compliance, internal controls, financial management, engagement management, and many other related services. Solutions such as PRACTICE CS and ENGAGEMENT CS, provide users with dashboards or user interfaces to facilitate the management of a professional practice and firm as well as management of discrete engagements associated with such a practice. Such systems provide tools to manage time-keeping, engagement assignments and time-tables/progress, invoicing/billing, Related to the delivery of professional services, there exist products and services directed to providing professional development resources, such as training, continuing professional education ("CPE" or "cpe"), professional accreditation reporting and tracking. Such products and services include, for example, REQWIRED®, MICROMASH®, Course Finder, Online Grading Center, PASSONLINE®, PPC, RIA, GEARUP®, Bell Learning, QUICKFINDER®, CPEFINDER®, Webinar Learning Network, and AUDITWATCH®. These services may be described as learning management tools that provide continuing education and training course, content, tracking, reporting and related functionality. Education and training content can be in print or electronic form or a combination and may be delivered in a variety of forms, including in-house seminars, live seminars, audio/video taped and streamed seminars and conferences, live seminars and conferences, self-study, learning self-study, and instructor-led learning. MICROMASH and PASSONLINE provide computer-based training, online learning, and continuing professional education content and services to financial professionals, CPA firms, global corporations, government agencies, associations, higher education institutions, and individual learners. Courses may be available online, via download, and CD format. GEARUP, Bell Learning, PPC, and AUDITWATCH offer live seminars and conferences, in-house training, self-study courses. Course Finder is an interactive, online search engine for CPE and training solutions. REQWIRED, a learning management solution (LMS) and CPE tracking solution directed to accounting and financial professionals offered by Thomson Reuters, provides learning libraries and tools for professionals to learn in an "on-demand" fashion to meet learning and development needs set by the practice group and the professional services firm or organization. REQWIRED provides computer-based "e-learning" training, pointing to overall "significant" increases in retention and transfer of learning, and heightened ability to apply skills on the job. Although cost-savings, convenience, tracking and monitoring are advantages associated with learning systems, these systems make up a fragmented market what is needed is a system that can integrate the various education and reporting related needs.

Most professionals are subject to mandatory continuing education requirements critical to licensing and practice in the associated area or profession. One problem associated with managing CPE requirements is that each state in the United States maintains a unique set of ever-changing rules and requirements. Keeping abreast of the various and changing requirements, and their applicability to each professional's unique situation, is a daunting and time-consuming task. REQWIRED's computer-based system includes some capabilities in the areas of continuing education tracking, CPE compliance management, rule change monitoring, and tracking of CPE requirements, e.g., for accounting professionals, lawyers, doctors and other professionals. REQWIRED includes capabilities in the areas of establishing and managing internal training.

The disjointed products and services discussed above and those known fail to provide professional organizations a comprehensive platform for integrating professional engagement, professional resources, engagement and staff management, professional and staff training, education and reporting, and related services associated with delivery of professional services.

In addition, the products and services offered today are not flexible enough to meet the ever changing needs of individuals or organizations. For example, it would be advantageous for professional organizations, as well as individuals, to have the ability to select what courses are to be included in program products and services to meet organizational and/or individual goals effectively.

Accordingly, there is a need for a comprehensive and/or integrated platform that accomplishes the before-mentioned needs for organizations and individuals in an efficient and effective manner.

SUMMARY OF THE INVENTION

Systems and techniques are disclosed that provide a comprehensive and integrated professional education and training platform, especially in the areas of tax, financial auditing and reporting, and planning and risk assessment. The systems and techniques allow an administrator to identify a subset of learning courses from a set of available learning courses for association with an educational product, and to assign individuals to each of the subset of learning courses.

Various aspects of the system relate to identifying a subset of learning courses to be associated with a program product and assigning individuals to the subset of learning courses. For example, according to one aspect a method of providing learning courses includes receiving a first signal indicative of an entity and a product identifier associated with the entity, the entity being at least one of an individual, educational concern and business concern, identifying a practice area associated with the first entity, identifying a subset of learning courses from a set of available learning courses based upon the practice area, and transmitting a second signal indicative of the subset of learning courses.

The method also includes receiving a third signal indicative of a selection of an learning courses from the subset of learning courses, in response to the third signal, incrementing a count in a counter, comparing the count to a predefined number associated with the product identifier, and transmitting a fourth signal for providing the subset of learning courses if the first count does not exceed the pre-defined number.

In one embodiment, the predefined number identifies a total number of learning courses allocated to the entity. The method can also include assigning a participant to at least one of the subset of learning classes.

In another embodiment, the method includes assigning the participant to the subset of learning classes if a total number of participants assigned to the subset does not exceed a threshold value, the threshold value associated with the at least one of the subset of learning classes. For example, in one embodiment, the threshold value is set to one (1).

In yet another embodiment, the method includes identifying one of the subset of learning classes as being a mandatory class or an optional class for the participant. The method can also include allowing the participant to assign the one of the subset of learning classes to the participant if the one of the subset is identified as the optional class. The method can also allow the participant to be unassigned from the one of the subset of learning classes if the one of the subset of learning classes is not commenced by the participant.

In one embodiment, the method also includes providing a graphical user interface for selecting the subset of learning courses. The method can also include receiving a payment based on the pre-defined number associated with the product identifier.

A system, as well as articles that include a machine-readable medium storing machine-readable instructions for implementing the various techniques, are disclosed. Details of various implementations are discussed in greater detail below.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

FIG. 7 depicts a user interface associated with creating a user account for access to the primary education services system;

FIG. 11 depicts a user interface associated with the user profile;

FIG. 12 depicts a learning path user interface associated with the user profile;

FIG. 13 depicts a learning path user interface associated with the user profile;

FIG. 14 depicts a learning path user interface associated with the user profile;

FIG. 16 depicts a screenshot representing a detailed Outlook appointment associated with the course entry of FIG. 15;

FIG. 19 depicts a user interface associated with a course progress function of the dashboard of FIG. 10;

FIG. 20 depicts a user interface associated with a course completion function of the dashboard of FIG. 10;

FIG. 21 depicts a user interface associated with a course builder function of the dashboard of FIG. 10;

FIG. 22 depicts a user interface associated with a course loader function of the dashboard of FIG. 10;

FIG. 23 depicts a user interface associated with a course publisher function of the dashboard of FIG. 10;

FIG. 26 depicts a user interface associated with a CPE course finder or search function of the dashboard of FIG. 10;

FIG. 27 depicts a user interface associated with a My Bookshelf function of the dashboard of FIG. 10;

FIG. 31 depicts a research user interface presenting search results associated with the user interface of FIG. 30 with education-related links;

FIG. 33 depicts an exemplary course offering screen displayed following a selection of a link from the user interface screen of FIG. 32;

FIG. 34 depicts an alternative exemplary course offering screen displayed following a selection of a link from the user interface screen of FIG. 32.

FIG. 39 depicts a user interface for use by an administrator to edit a product;

FIG. 40 depicts a user interface for use by an administrator to display details of a product;

FIG. 41 depicts a user interface for use by an administrator to display details of a product;

FIG. 42 depicts user interface for use by an administrator to describe a product;

FIG. 43 depicts a user interface for use by an administrator to select learning courses relating to a product;

FIG. 44 depicts a user interface for use by an administrator to assign an individual to learning courses.

FIG. 45 depicts a user interface for displaying learning courses associated with products.

FIG. 46 depicts a user interface for displaying details of learning courses associated with a product; and FIG. 47 depicts a user interface for displaying descriptive information of an learning courses associated with a product.

Like reference symbols in the various drawings indicate like elements.

DETAILED DESCRIPTION OF THE PREFERRED EMBODIMENT

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

The invention provides an integrated professional services research, resource, and education delivery and management system. The invention provides a common entry point for education and training products and services and integrates professional resource and practice management systems with professional education, training, requirements and reporting systems. Through integration, the invention provides a more efficient and effective learning environment fully integrated in the practice of a given profession. The invention provides an integrated system that promotes a learning environment that more quickly advances and cultivates the skills of professionals and more closely relates and monitors such development with engagements, practice areas and specialties, and licensure jurisdictions associated with individuals.

Figure 1:
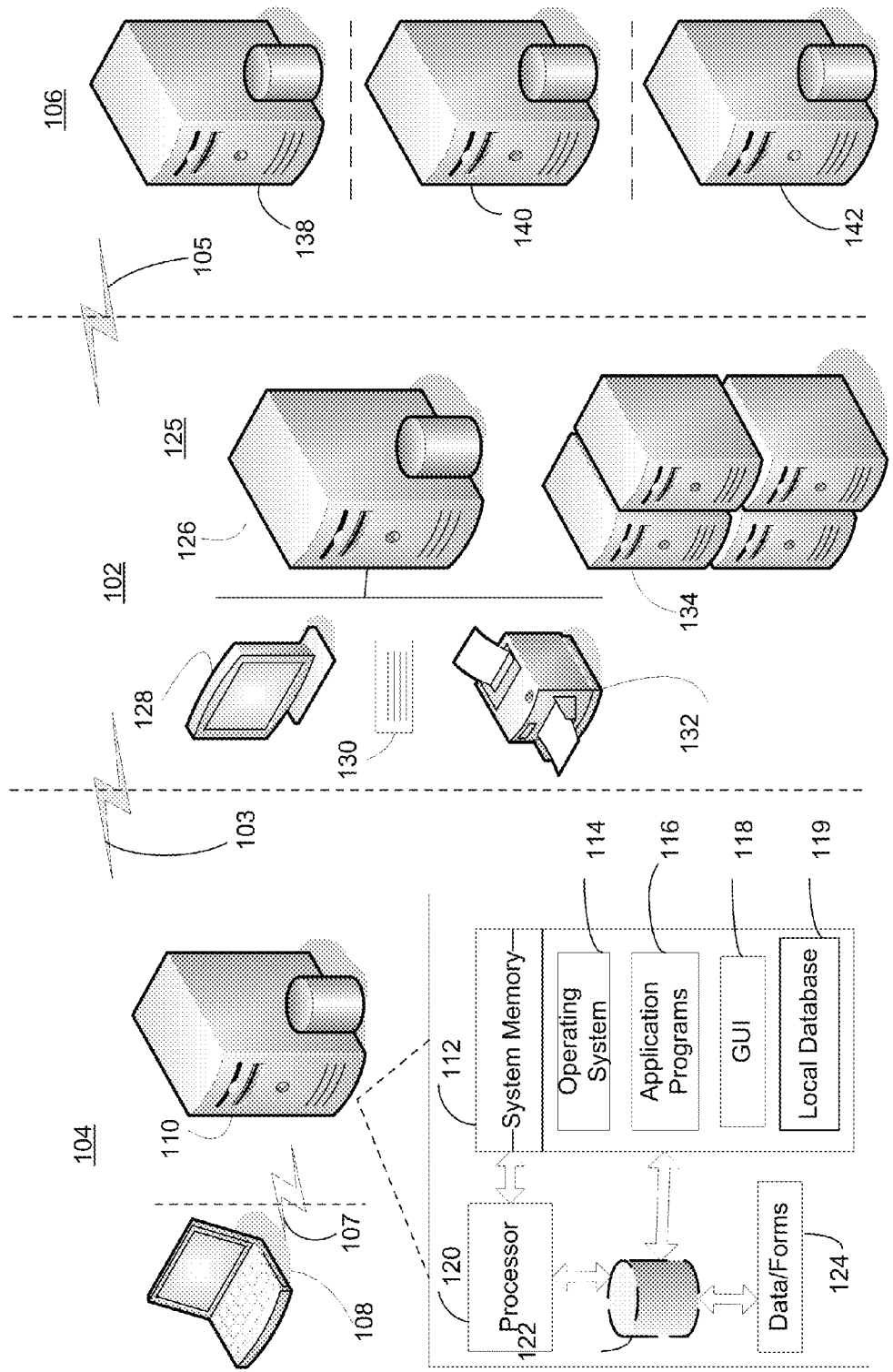
FIG. 1 is a schematic diagram of a first exemplary system embodiment of the present invention.

Referring now to FIG. 1, a professional resource system (PRS) is shown for providing a practice management system coupled with an education and learning platform for use in cultivating and maintaining skills and credentials of a group of professionals involved in the delivery of professional services, e.g., an accounting or law firm. The PRS comprises a network-based professional education aspect 102, a practice management system (PMS) 104 and remote jurisdiction-based professional license and credential aspect 106. In one exemplary embodiment, the professional services practice management facility 104 executes a practice management software application that may be specifically directed to use in a particular industry or profession, e.g., accounting and auditing. An example of a commercially available practice management software solution is the Thomson Reuters CS PROFESSIONAL SUITE, including PRACTICE CS, ULTRATAX CS and other software applications.

In this example, authorized users 108, such as a financial professional conducting an audit, preparing a tax return, etc., may use a mobile or local device, such as a wireless-enabled notebook computer or network-connected desktop computer or other suitable machine to connect to the practice management system 104 via communication link 107, such as the Internet, Ethernet, WLAN, WAN or other suitable network. PMS 104 provides, for example, a web-based, GUI-driven user interface for presenting professional services practice management data and processes. PMS 104 may be part of a professional services firm or corporate-based network having PMS software executing on a firm/company-based system. In the alternative, PMS may be a web-based system to which a company or firm has a license and to which its employees may connect for content delivery and other services. User system 108 may connect directly with education aspect 102 and/or the licensing/credential aspect 106 or may access such services via the PMS 104. PMS 104 may access education services aspect 102 and/or licensing/credential aspect 106 via communication links 103 and 105. This configuration is one of many and is not limiting as to the invention.

For example, in one alternative configuration user system 108, which may comprise a central server connected to a network of computers, may include the PMS independent of a web-based service. In this example computer 110 executes the PMS software and processes practice related data and may utilize a local database 119, such as SQL 2005 or above or SQL Express or other suitable database. Communication links may be a combination of wireless, LAN, WLAN, ISDN, X.25, DSL, and ATM type networks, for example. The central PMS computer 110 may comprise a typical combination of hardware and software including system memory 112, operating system 114, application programs 116, graphical user interface (GUI) 118, processor 120, and storage 122 which may contain electronic information 124 such as forms, practice aids, titles, data, procedures and the like. The operating system 114 shall be suitable for use with the practice management functionality described herein, for example, Microsoft Windows Vista (business, enterprise and ultimate editions), Windows 2000 with SP4 or Windows XP Professional with SP2. Also, the PMS software may be browser-based and/or may include custom integration with Microsoft Office applications, e.g., Outlook, Word and Excel. Application programs 116 may include, for example, Microsoft Office 2007, Office XP with SP2, or Office 2003 with SP1 applications as well as professional services related software described above. The software and related tools, procedures, forms and data used to implement the PMS 104 processes may be accessed by the machine 110 via the Internet or it may be loaded onto the machine via CD-ROM or other media or a combination of such means.

For purposes of discussion, education aspect 102 may comprise a primary education services access system 125, comprising a central server and database 126, user interface peripherals such as drives (not shown), monitor 128, keyboard 130, and printer 132, and one or more additional education services systems 134. The central server and database 126 may be used to communicate remotely, or locally for that matter, directly with PMS 104 or with the user system 108 and may load, pass, receive information and instructions, such as software executable on the machine 110, or the machine 108, and data, forms, titles, guides, procedures and the like for storing and using locally by PMS 104 and/or user system 108. The primary education services access system 125 may be a web-based service primarily directed to delivering continuing professional education content and services or may be an overarching professional resource system, such as Thomson Reuters' CHECKPOINT system, which may have an education-focused component, e.g., CHECKPOINT Learning. In either scenario, system 125 includes an education resource interface, such as a web-page, directed to presenting users who are authorized to access the system with information, links, etc., concerning professional education and training.

Examples of additional education services systems 134 are REQWIRED, MICROMASH, Course Finder, Online Grading Center, PASSONLINE, PPC, RIA, GEARUP, Bell Learning, QUICKFINDER, Webinar Learning Network, and AUDITWATCH. Preferably one or more of the combination of PMS 104, primary education services access system 125, and additional education services systems 134 are configured to accommodate single-sign-on (SSO) to facilitate user recognition and access across the various education and practice management components. For instance, using SSO, a user at system 108 may log onto and access, either directly or through PMS 104, primary education services system 125 by entering an authorized account login profile either recognized by application software running at computer 110 or at system 125. Preferably, the system 125 includes a user authentication system (UAS) that processes user login credentials and enables access to recognized, authorized user accounts presented from system 108. The UAS, described further herein below, preferably uses a single-sign-on or similar process to coordinate authorization and access across the additional education services systems 134, which may be done using database structures and associations.

The remote jurisdiction-based professional license and credential aspect 106 is illustrated for exemplary purposes only as including separate server/database systems 138, 140 and 142. Each system represents a separate jurisdiction-based professional license/credential entity, or collection of entities, accessible via a communication link. Exemplary entities include, federal, state, local, international professional licensing authorities, for instance state bar organizations, certified public accounting organizations, board of accountancy jurisdictions, as well as licensing authorities for Certified Financial Planner, Certified Financial Advisor, Chartered Alternative Investment Analyst, Chartered Life Underwriter, Chartered Financial Consultant, Chartered Advisor for Senior Living, Chartered Property Casualty Underwriter, Financial Risk Manager. In addition, professional organizations such as societies may be included, for instance the American Bar Association (ABA), American Institute of CPAs (AICPA), and state bar and CPA societies. In this manner the primary education services access system 125 can interact with web-based systems of professional organizations via communication link 105. In addition, once the system 125 has facilitated access, a user via PMS computer 110 or directly may connect to the remote jurisdiction systems 138-142 to facilitate reporting of continuing education course completion and credit confirmation. This framework also may be used to facilitate membership benefits and interaction of users with professional organizations. In this manner, the systems 102, 104 and 106 may be configured according to the invention to establish an integrated professional services resource, practice management and professional education system. All or part of the necessary connections between systems 102, 104, and 106 may be Internet or (World Wide) WEB-based, Ethernet, wireless network, optical network or a combination and may be comprised of desktop-based, central server-based, or WEB-enabled or a combination.

Figure 2:
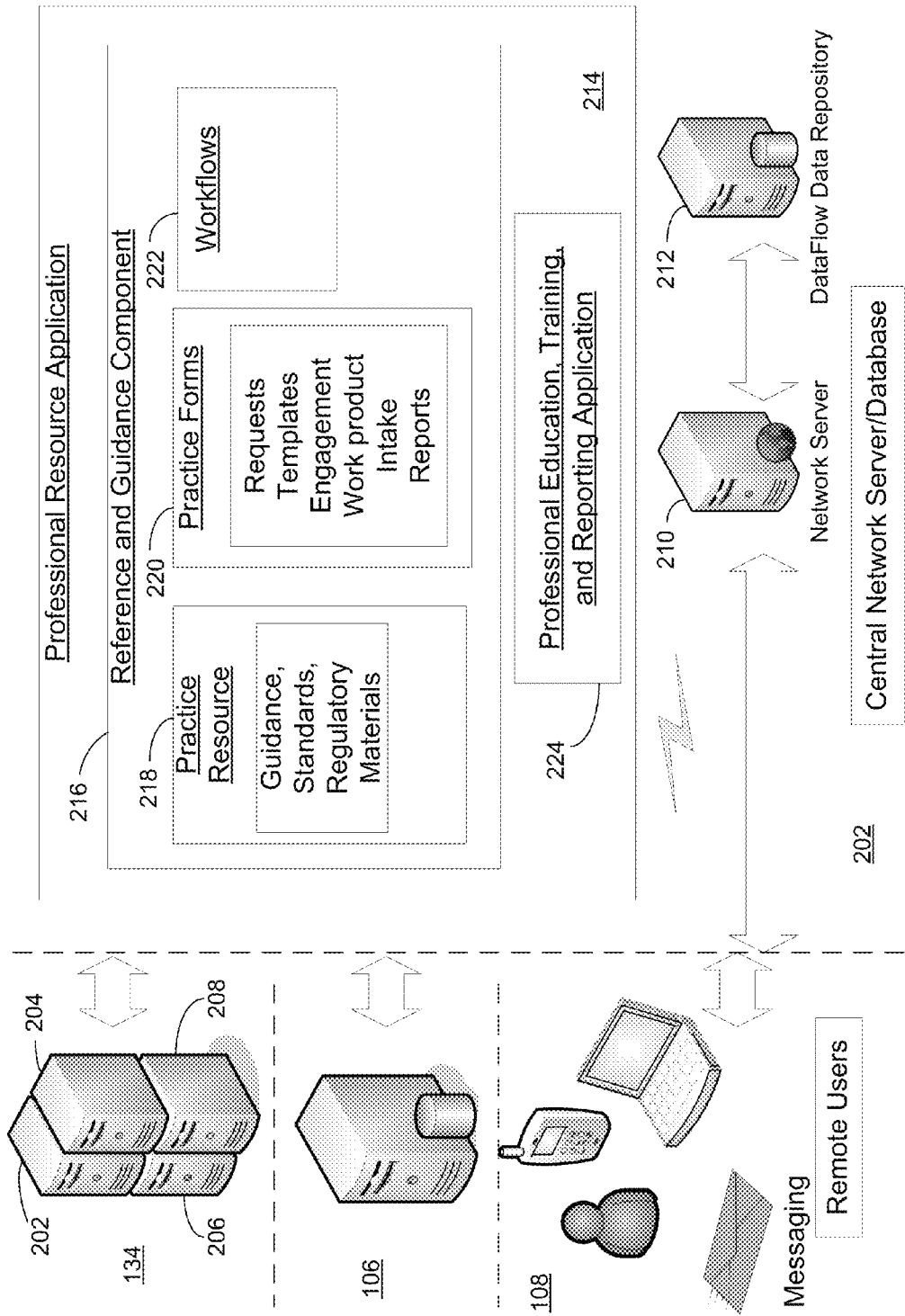
FIG. 2 is a schematic diagram of a second exemplary system embodiment of the present invention.

Referring now to FIG. 2, a Professional Resource System 202, for example Thomson Reuters' CHECKPOINT and related services, comprises a Professional Resource Software 214 operating on a Network Server 210 and operating in conjunction with a data repository 212, such as a relational database. Professional Resource Software 214 includes Reference and Guidance Component 216, which includes Practice Resource module 218, Practice Forms module 220, and Workflow module 222. Practice resource module 218 is adapted to present to authorized users guidance, standards, regulatory and other materials and information to assist in the rendering of professional services. Practice Forms module 220 is adapted to provide authorized users with various practice related forms and related information used in rendering professional services, including requests, templates, engagement, work product, intake and reports. Workflow module 222 may be used to generate, implement and track work-related processes. Education and training processes may be the primary concern of workflows or aspects, reminders, etc., of such processes may be included in workflows generated by use of module 222. In addition, the Professional Resource software also includes a professional learning (education, training, and reporting) software component 224, which, for instance, when accessed by an authorized user, such as user system 108, presents a personalized learning web-page or portal directed to presenting a user interface or dashboard directed to the individual associated with the user account logged on. User 108, including via PMS 104, may also connect to and interact with additional education services systems 134 and remote jurisdiction-based professional license and credentials systems 106 through access granted, such as by SSO or the like techniques, Professional Resource System 202.

Figure 3:
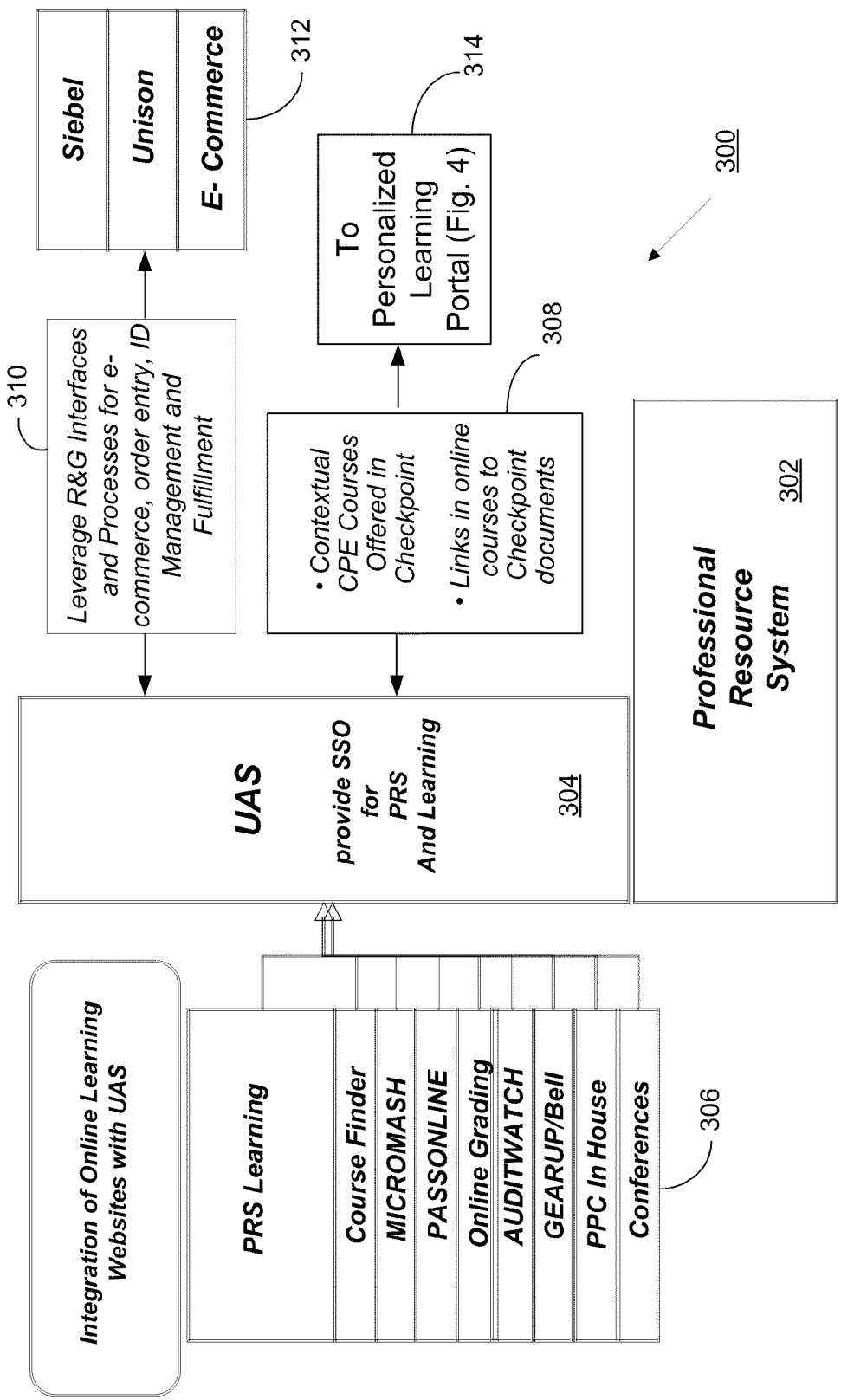
FIG. 3 is a schematic diagram of a user authentication system integration of learning system resources with a professional services research platform exemplary functionality for use in conjunction with the present invention.

FIG. 3 is a schematic diagram showing a Practice Management and Learning System 300 having a Professional Resource System 302 and related database(s), e.g., CHECKPOINT, operating in conjunction with a user authentication system (UAS) 304 adapted to process user login credentials and enables access to recognized, authorized user accounts presented from, for example, user system 108. The UAS 304 is used to manage IDs and preferably uses a single-sign-on or similar process to coordinate authorization and access across the additional education services systems 306, which may be done using database structures and associations. UAS 304 may include a pre-validation process to determine the specifics of a particular user's or student's system subscription. Tagging, as discussed herein below, and the presentment of links within content of either the Professional Resource System 302 or a learning system may be suppressed or determined, i.e., some, none or all links displayed, based on a user's subscription. Messages, such as "You must be a Professional Resource System subscriber—would you like information about subscribing to the service?" with options such as "No thanks" or "View information," may be displayed upon selection of a link to a course or content that is not available to that particular user.

The system can in effect assign a lifetime user account/profile unique to that individual and the individual's learning history stays with that person for life. Contextual CPE course offerings may be presented along with links and other information to users via personalized web-portal or learning homepage, discussed below in reference to FIG. 4. In addition, UAS 304 may include or interact with an interface component 310 to interface the Professional Resource System 302 with outside e-commerce, order entry, identification management and fulfillment resources 312, e.g., Siebel, Unison, and other offerings. For example, UAS 304 may connect with the order management component of Siebel CRM software (Oracle Corporation) to allow for assignment of IDs as part of an initial order. In this manner users authorized to access and use the Practice Resource System 302 may further access websites or pages available from other education resource sites via a personalized learning portal. In addition, Practice Management and Learning System 300 includes, for example through use of database structure techniques, a contextual CPE course and linking component 308, discussed further below, that is used in conjunction with delivery, tracking and reporting of learning content and events via Personalized Learning Portal 402. In this manner Practice Management and Learning System 300 provides a professional services practice management solution that is integrated with a professional learning system. For instance, using database structures content and tools associated with a professional services resource, such as content and tools delivered by CHECKPOINT, may be associated with learning content and course offerings of and links to education services systems. The integration of services is presented to an individual professional/learner by way of the Personalized Learning Portal 402 and associated user interfaces. Examples of this integration are discussed herein below.

In one exemplary operation, a student accesses learning courses and materials based on a subscription to the Professional Resource System 302 by a pre-validation process that is invoked at the time a Student launches a course which confirms his/her personal authorization in the Professional Resource System. Based on the student's personal authorizations in Professional Resource System 302, the pre-validation process then suppresses any/all links pointing to documents not available through the student's subscription. Once the student's subscription is validated, the student may navigate within Practice Resource System 302 to the extent their subscription permits as if they had logged directly into that system.

In an alternative scenario, when a Student is not a subscriber to Practice Resource System 302, a pre-validation process may be invoked at the time a Student launches a course which confirms the Student's lack of a subscription. In this event, the pre-validation process will cause all identified links to display. Each link will offer the user access to the Practice Resource System 302 subscription information, for example by presenting a window or dialog box to view information about becoming a subscriber.

The UAS 304 also may be utilized to define and customize one or more educational products, such as a bundle of courses, that is to be associated with an entity (e.g., individuals, educational concerns or business entities)

For example, in one embodiment, an entity may purchase a predefined number of courses that are associated with a particular product offering. Payment for the pre-defined number of courses from the entity is received and/or identified by the system. The particular product offering, also referred to herein as a "bundle", is identifiable in the system using a product identifier. Example product identifiers include, but are not limited to "Pick 5", "Pick 10", "Pick 15", etc. As indicated in the product identifier, a predetermined number of courses can be associated with a particular product offering for an entity. For example, an entity interested in purchasing five (5) courses would purchase a "Pick 5" product offering allowing the entity to select five (5) courses from a plurality of available courses. In one embodiment, the plurality of available courses is determined based on practice areas associated with the entity. For example, in one embodiment, practice areas associated with an entity include, but are not limited to, courses relating to the following practice areas: "Federal", "State and Local", "International", and "Pension and Benefits". As described in further detail below, entities are provided the ability to select which of the courses are to be associated with a product offering, as long as the number of selected courses does not exceed a pre-defined number associated with the product identifier and/or product offering. An example interface provided by the UAS 304 to create, customize, and search for a bundle of courses is shown in connection with FIGS. 36-40.

Figure 36:
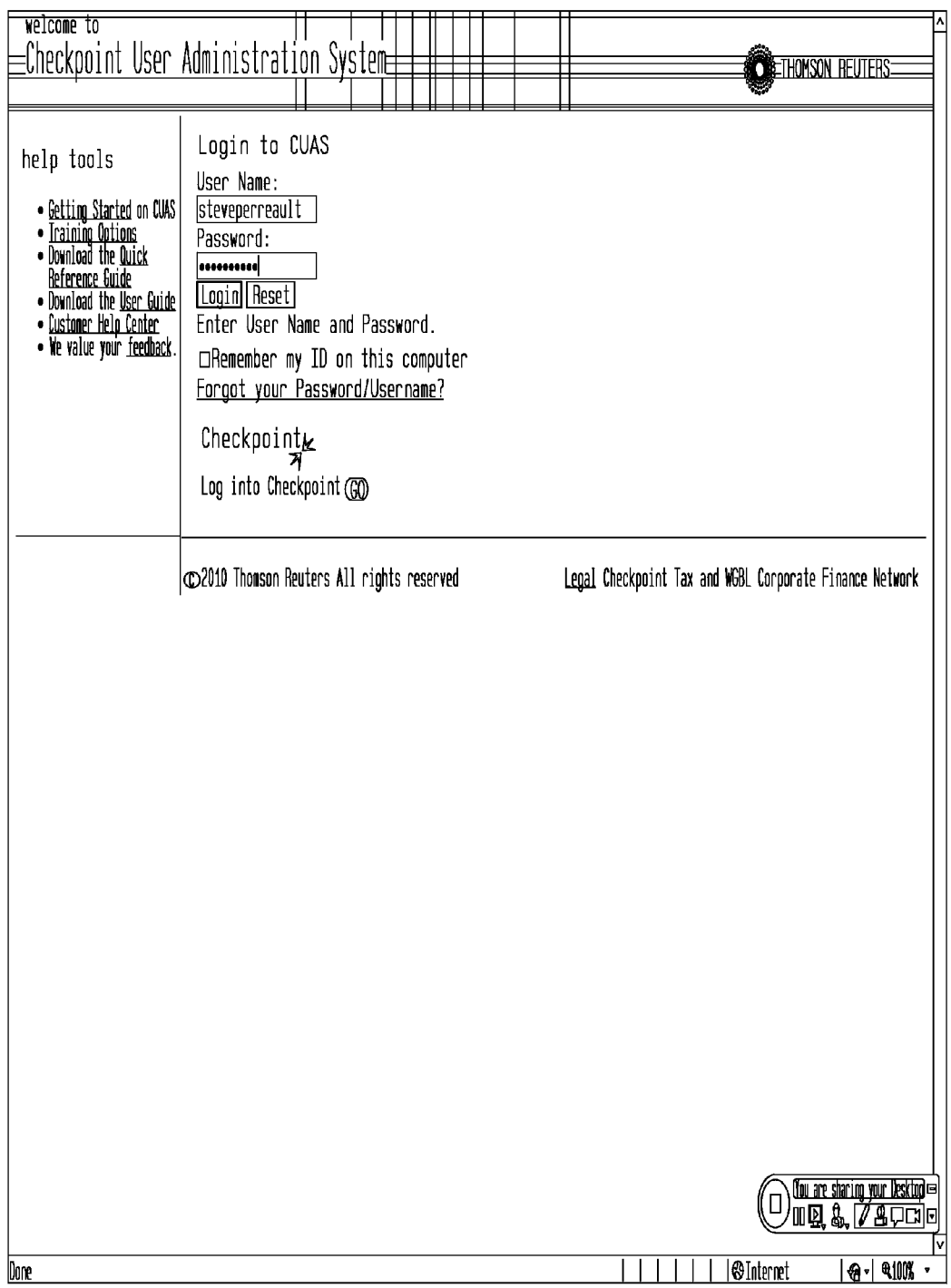
FIG. 36 depicts a user interface for use by an administrator for logging into an administrative portion of the system.

Turning now to FIG. 36, a user interface provided by the UAS 304 for use by a system administrator is disclosed. As shown in the FIG. 36 example, in one embodiment, the user interface includes a user name data entry field for entering a system administrator user name, and a password data entry field for entering a password associated with the administrator user name. A reset button is provided that once selected by the administrator, clears any data values entered into the user name data entry field and the password data entry field. A login button is also provided that once selected by the system administrator transmits data values from the user name data entry field and the password data entry field for authentication. Upon authentication, the UAS 304 provides product definition and search capabilities to the system administrator.

Figure 37:
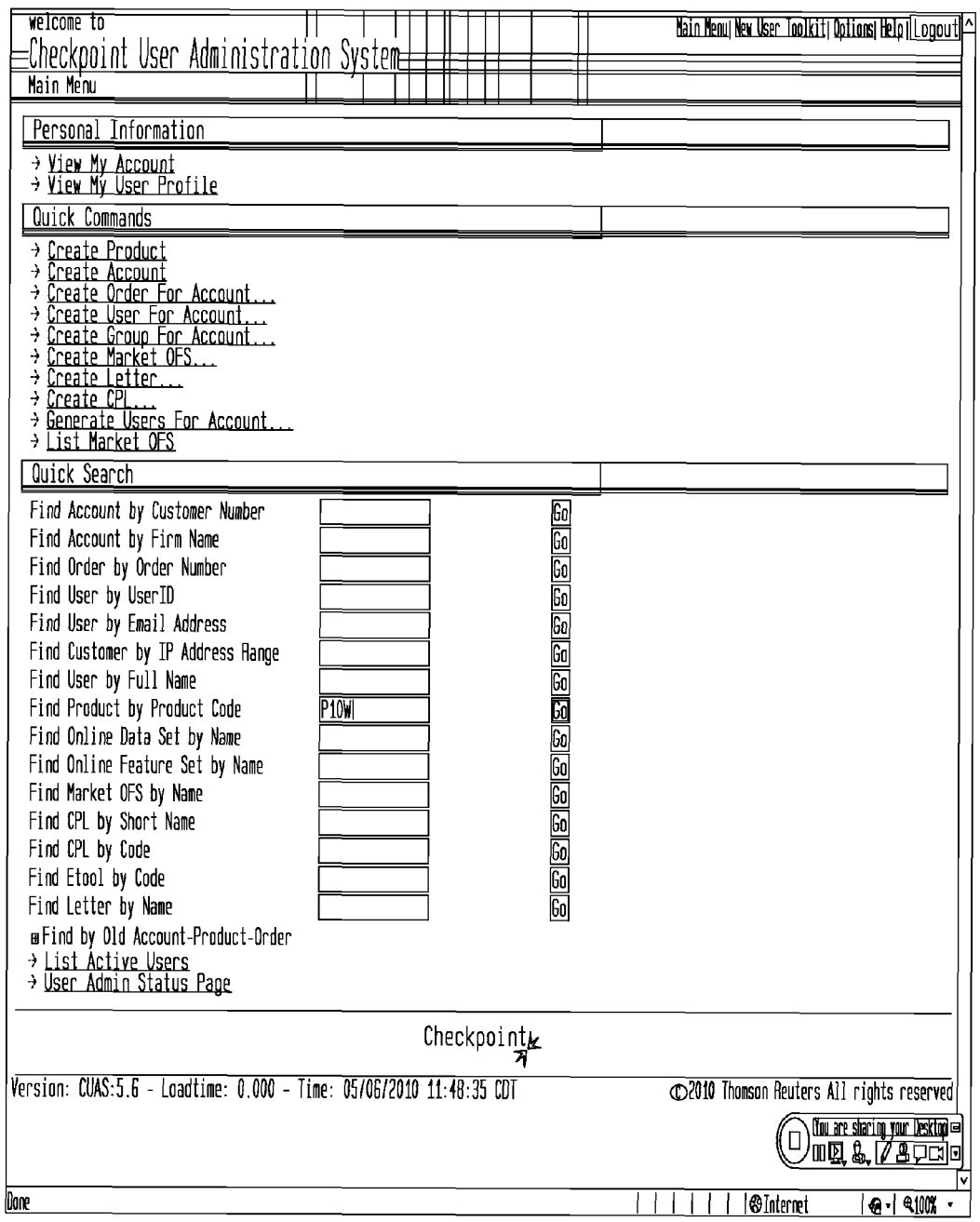
FIG. 37 depicts a user interface for use by an administrator to create and search for one or more products.

FIG. 37 illustrates a user interface provided by the UAS 304 upon system authentication. As shown in the FIG. 37 example, the user interface includes a "Quick Command" portion that includes hyperlinks to create products, create accounts, create orders for accounts (e.g., associate a created product with an entity), and the like. A "Quick Search" portion of the user interface is also provided that allows a system administrator to specify query information relating to product identifiers (i.e., product codes), customer (i.e., entity) names and numbers, etc. In one embodiment, the user interface also includes data entry fields for entering query terms. Each of the data entry fields is associated with an action "Go" button that once selected, causes the UAS 304 to execute the requested query. As shown in the FIG. 37 example, a query of the product associated with the product identifier "P10W" is shown. FIG. 40 illustrates a user interface provided by the UAS 304 that displays parameters associated with the "P10W" product upon execution of the query.

Figure 38:
FIG. 38 depicts a user interface for use by an administrator to create a product.

Turning now to FIG. 38, a user interface provided by the UAS 304 to create a product is disclosed. As shown in the FIG. 38 example, in one embodiment, the user interface includes a "product name" data entry field, a "product code" (e.g., product identifier) data entry field, and a "short description" data entry field for describing the product being created. A "product start date" data entry field, "product status" pull down menu, and "practice area" pull down menu are also provided for the system administrator to specify the offer date of the product, product status, and one or more practice areas, respectively, to be associated with the product and/or entity. A "courses allowed" data entry field is also provided that allows the system administrator to specify how many courses are allowed to be selected by the entity for the product. In one embodiment, a "number of seats allowed" data entry field (not shown) is also provided that allows the system administrator to specify how many individuals/participants can be assigned to the number of courses allowed. A "threshold value" is also discussed herein which identifies a number of seats allowed per course.

FIG. 39 illustrates a user interface screen provided by the UAS 304 for editing a created product/bundle. As shown in the FIG. 39 example, various characteristics of a created product can be modified which include, but are not limited to, product name, product code, short description, whether the product is royalty based, product start date, practice areas, product visibility—an indicator as to whether or not the product is viewable by one or more entities, package type—an indicator as to what system is to provide the product, site letter type—an indicator as to whether an entity is to receive a letter relating to the product, a "bundle" toggle button to indicate whether an entity is allowed to select courses for the product, a "courses allowed" value to set a predetermined number of courses that can be selected for the product (e.g., bundle), and a "consumed" toggle button to indicate whether any individuals that have been assigned to courses associated with the product have initiated any of the courses. An "update" button is also provided that once selected, sends a signal to the UAS 304 to store all modified information displayed in the user interface as configurable parameters for the product. For example, in one embodiment, product parameters are stored by the UAS 304 using programmatic tools, such as Spring Services and Hibernate, as a persistence framework that is configured to provide CRUD (Create, Read, Update and Delete) functionality on UAS 304 databases.

The Professional Resource System (PRS) 302 allows a firm administrator (e.g., an administrator associated with the entity) to assign individuals/participants to one or more bundles of courses associated with the entity.

FIG. 41 illustrates a user interface that is provided by the PRS 302 to the firm administrator upon accessing a University Homepage of the entity. The University Home Page includes a University Menu portion that identifies one or more products available to an entity and a display area that displays product information to the entity. For example, as shown in the FIG. 41 example, upon the firm administrator selecting the product "Kemper CPA Group Bundle", the PRS 302 displays in the display area bundle package information, account statistics, courses included in the bundle, and currently assigned individuals associated with the "Kemper CPA Group Bundle" product. As shown in the FIG. 41 example, the PRS 302 indicates that a total of seventy-five (75) seats have been defined for the ten (10) courses selected for the "Kemper CPA Group Bundle", in which eleven (11) are currently assigned to participants. The "lock" symbol in the status column of the "assigned employees" section of the display area indicates that two (2) individuals, "Gary Clark" and "Clark Kent" have already launched one or more of the courses included in the "Kemper CPA Group Bundle". Accordingly, as described later, the PRS 302 will not allow the electronic seats occupied by "Gary Clark" or "Clark Kent" to be reallocated to other individuals/participants.

Figure 42:
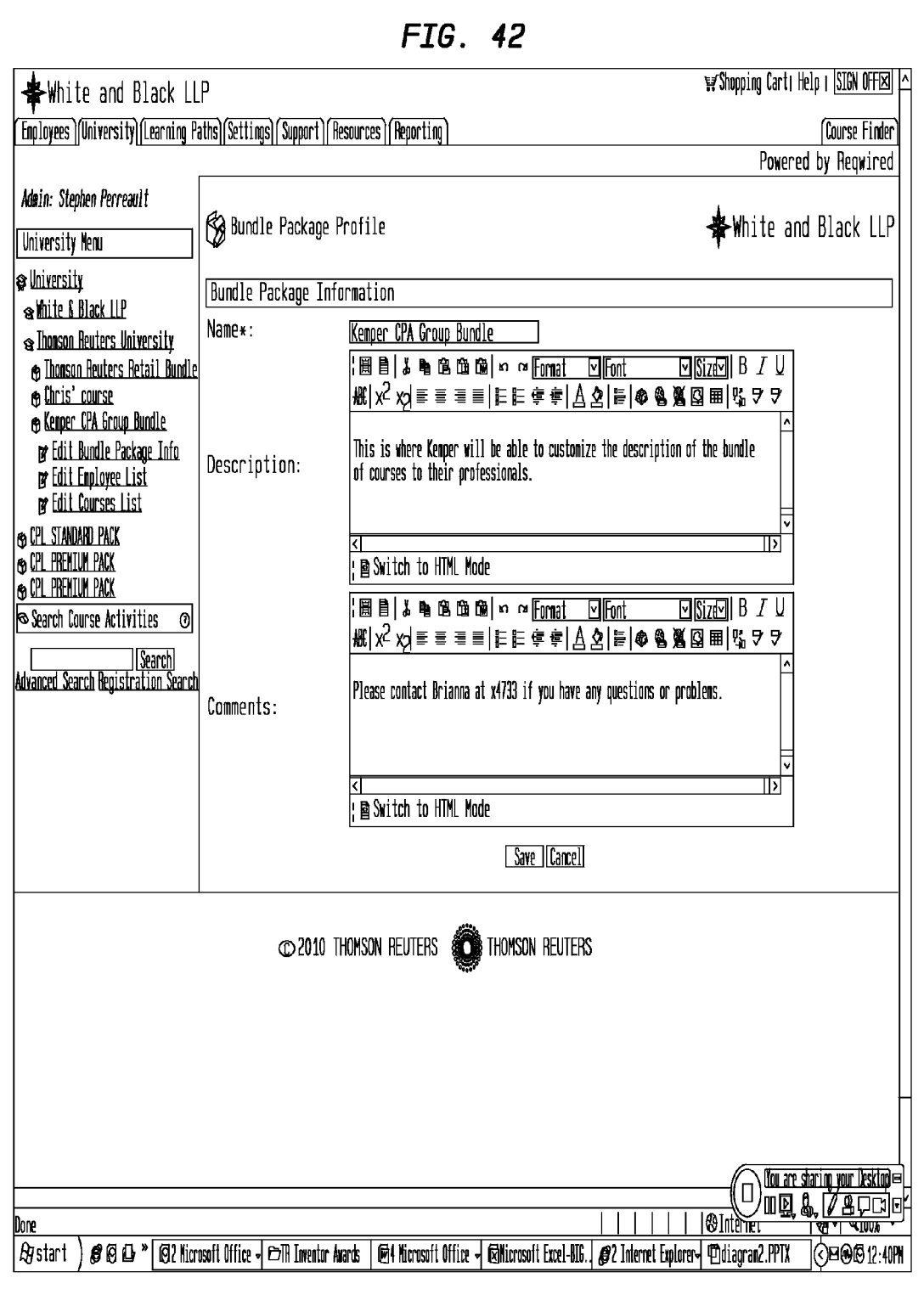

FIG. 42 illustrates a user interface that is provided by the PRS 302 to the firm administrator upon selection of the "Edit Bundle Package Info" hyperlink provided under the University Menu portion of the user interface shown in FIG. 41. As shown in the FIG. 42 example, the product name, description, as well as comments regarding the product can be created and/or updated with text entered by the firm administrator. Upon selection of a Save button shown in FIG. 42, any modifications to the text associated with the product name, product description, and/or product comments are stored by the PRS 302 in a database and are associated with the product.

Figure 43:
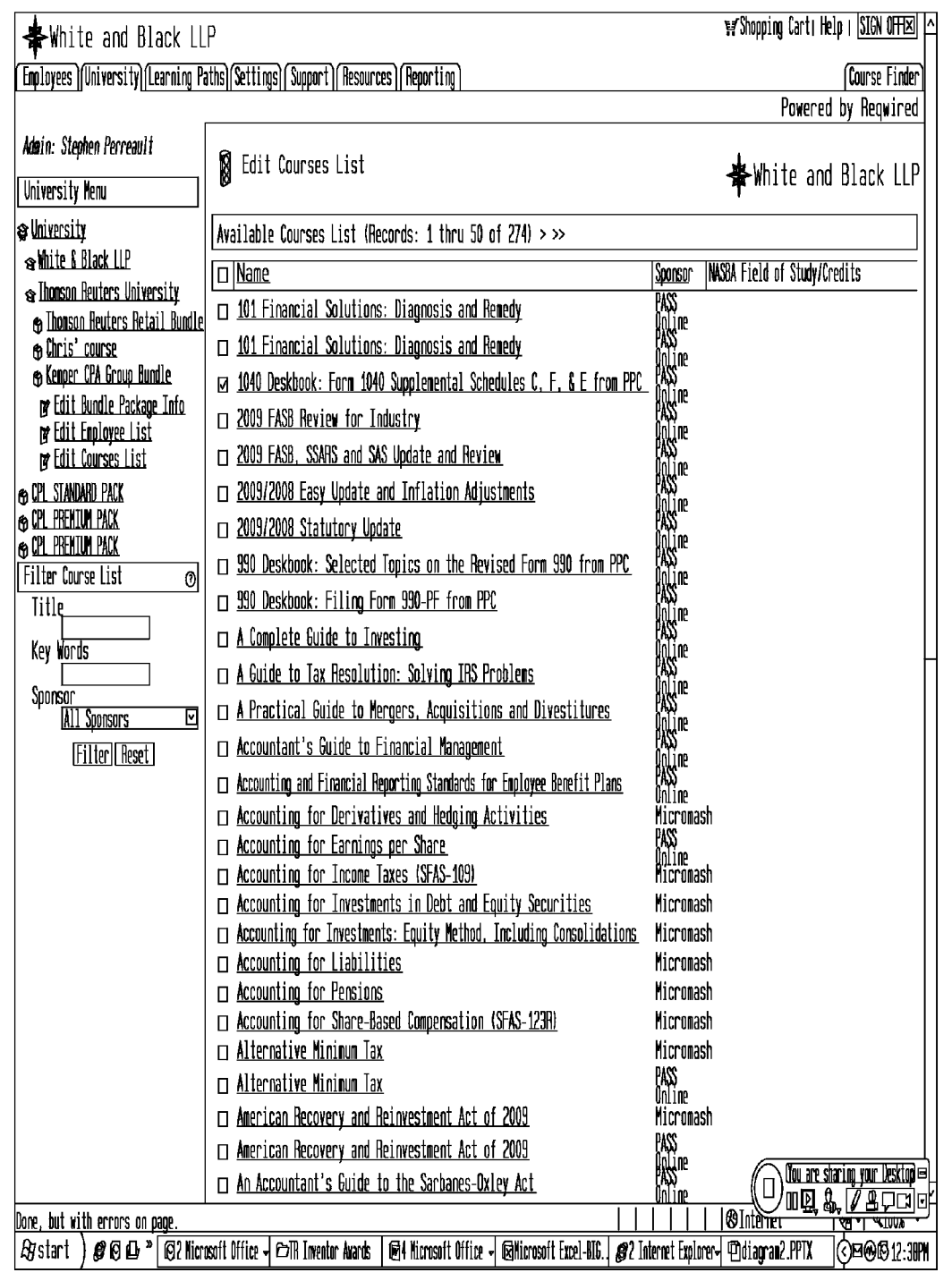

FIG. 43 illustrates a user interface provided by the PRS 302 to select and edit courses to be associated with a product/bundle. To provide a list of available courses to select, in one embodiment, the PRS 302 receives a signal indicative of the firm/entity name and a product identifier associated with the entity. The PRS 302 then identifies one or more practice areas associated with the entity and identifies a subset of learning courses from a set of available learning courses. The PRS 302 then transmits a list of the subset of learning courses for display on the user interface.

As shown in FIG. 43, each course identified in the list by the PMS 302 is displayed with an associated toggle button. Upon selection of an associated toggle button, the PRS 302 receives a signal indicative of a selection of one of the list of courses. The PRS 302 then increments a count in a counter associated with the product, and compares the count to the predefined number of courses defined for the product. If the computed count does not exceed the pre-defined number of courses established for the bundle, the selected course is associated with the product and made available to individuals associated with the bundle/product. Otherwise, the PRS 302 provides an error message to the firm administrator indicating that a maximum number of courses are allocated to the product.

The pre-defined number of courses established for a bundle can also be time-dependent. For example, in one embodiment, upon a system administrator creating a bundle, the system administrator is provided an option to select a time period in which the bundle is to be made available to a firm administrator. Upon expiration of the time period, no further courses can be associated with the bundle. In yet another embodiment, upon expiration of the time period, the bundle itself is no longer accessible to the entity.

In one embodiment, the PRS 302 allows previously selected courses to be unassociated with a product/bundle, provided that no assigned individuals to the product initiated the selected course to be unassociated.

Turning now to FIG. 44, a user interface provided by the PRS 302 to the firm administrator to assign individuals to a product/bundle is disclosed. As shown in the FIG. 44 example, in one embodiment, the PRS 302 provides a list of individuals with associated toggle buttons to the firm administrator upon selection of the "Edit Employee List" hyperlink displayed on the University Menu portion of the user interface. Upon selection of a toggle button associated with an individual, the PRS 302 receives a signal indicative of the individual selection. The PRS 302 increments a count value in a counter associated with the total number of seats allocated to the bundle, and then compares the counter value to a pre-defined number of participants allowed access to the bundle. If the computed count value does not exceed the predefined number of participants defined for the bundle, the selected individual/participant is associated with the bundle. Once a participant is associated with a bundle, the course is made available to the participant through a user interface described below. Otherwise, the PRS 302 provides an error message to the firm administrator indicating that a maximum number of participants are allocated to the bundle.

In one embodiment, each of the courses associated with the product has a threshold value that indicates the number of participants allowed to be enrolled in the course. The threshold value for each course is established by the system administrator. In one embodiment, the threshold value for each course included in a product/bundle is set to a default value of one (1).

In one embodiment, the PRS 302 allows a participant to be assigned to a particular course if a total number of individuals/participants assigned to the course does not equal or exceed the threshold value. Otherwise, the PRS 302 indicates that the threshold value has been met and transmits a message to the user interface for display to the firm administrator indicating the same.

In one embodiment, the PRS 302 also allows a firm administrator to indicate whether a course included in a product/bundle is a mandatory course or an optional course for a participant. If the assigned course is identified as being an optional course, the PRS 302 provides functionality allowing individuals associated with the entity to assign themselves to the optional course.

Figure 45:
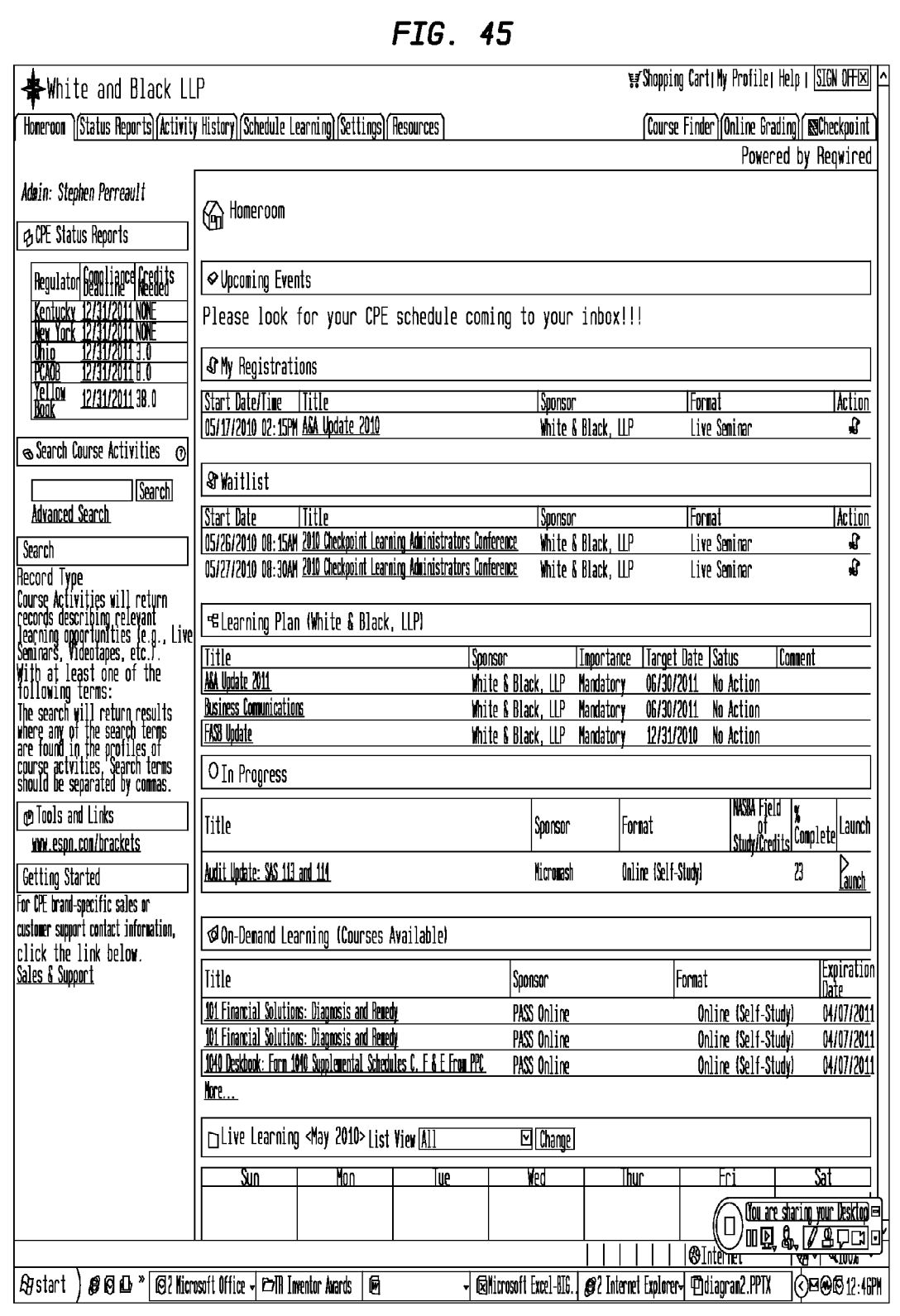

Turning now to FIG. 45, an example user interface provided to a user (e.g., participant) by the PRS 302 for displaying courses associated with products/bundles is disclosed. The user interface includes a plurality of selectable tabs that include a "Homeroom" tab, a "Status Reports" tab, an "Activity History" tab, a "Schedule Learning" tab, a "Settings" tab, and a "Resources" tab. Selection of the "Homeroom" tab by the user displays an "Upcoming Events" section, a "My Registrations" section, a "Waitlist" section, a "Learning Plan" section, an "In Progress" section, an "On-demand learning (Courses Available)" section, and a "Live Learning" section. In the example, shown in FIG. 45, three titles of courses assigned to the user are shown through the user interface.

FIG. 46 illustrates an example user interface that is provided by the PRS 302 upon selection of the "Schedule Learning" tab shown in FIG. 45. As shown in FIG. 46, the user interface includes a "Schedule Learning Menu" area that includes a plurality of user selectable hyperlinks for displaying learning course information relating to a particular user. For example, as shown in FIG. 46, upon selection of the "Kemper CPA Group Bundle" hyperlink, a user selectable list of courses assigned to the user are displayed in a display area of the user interface. In one embodiment, for each course included in a product/bundle, the list includes a hyperlink indicating the title of the course, a course sponsor name, a format of the course, an indication as to whether the course is entitled to any credits, and an expiration date for the course.

Upon a user selecting a hyperlink title of a particular course, the PRS 302 displays a user interface that shows course activity details and a detail description for the selected course. For example, referring now to FIG. 47, course activity details for the "Audit Update: SAS 113 and 114" course includes a course title, a course identification number, a parent course if applicable, course sponsor, course format, an e-learning host identifier, as well as key words associated with the particular course. The detail description of the course displayed includes a narrative explaining topics covered by the course, objectives of the course, any prerequisites of the course, whether the course qualifies for credits, and other related information as shown in the FIG. 47 example. The user interface also includes a "Launch" button that once selected by the user, begins the particular course for the user.

In one embodiment, if the user is assigned to a course and has launched the course, the PRS 302 provides the user with a version of the course that was available at the time of launching of the course. If the user is assigned to a course but never launched it, the PRS 302 provides the user access to view the latest version of the course when the user chooses to launch the course.

Once a user has launched a course, the PRS 302 stores the version and provides the user with access to only that version of the course, even if a newer or updated version of the same course is published. For example, on subsequent launches of the course by the user, the PRS 302 provides the user access to the version of the course previously launched, and not an updated version of the same course.

In one embodiment, the user interfaces shown in connection with FIGS. 36-45 form a portion of a learning interface system 400 that is part of the Practice Management and Learning System 300. Accordingly, structure for implementing the above referenced functionality in one or more systems is shown in connection with FIGS. 1-6.

Figure 4:
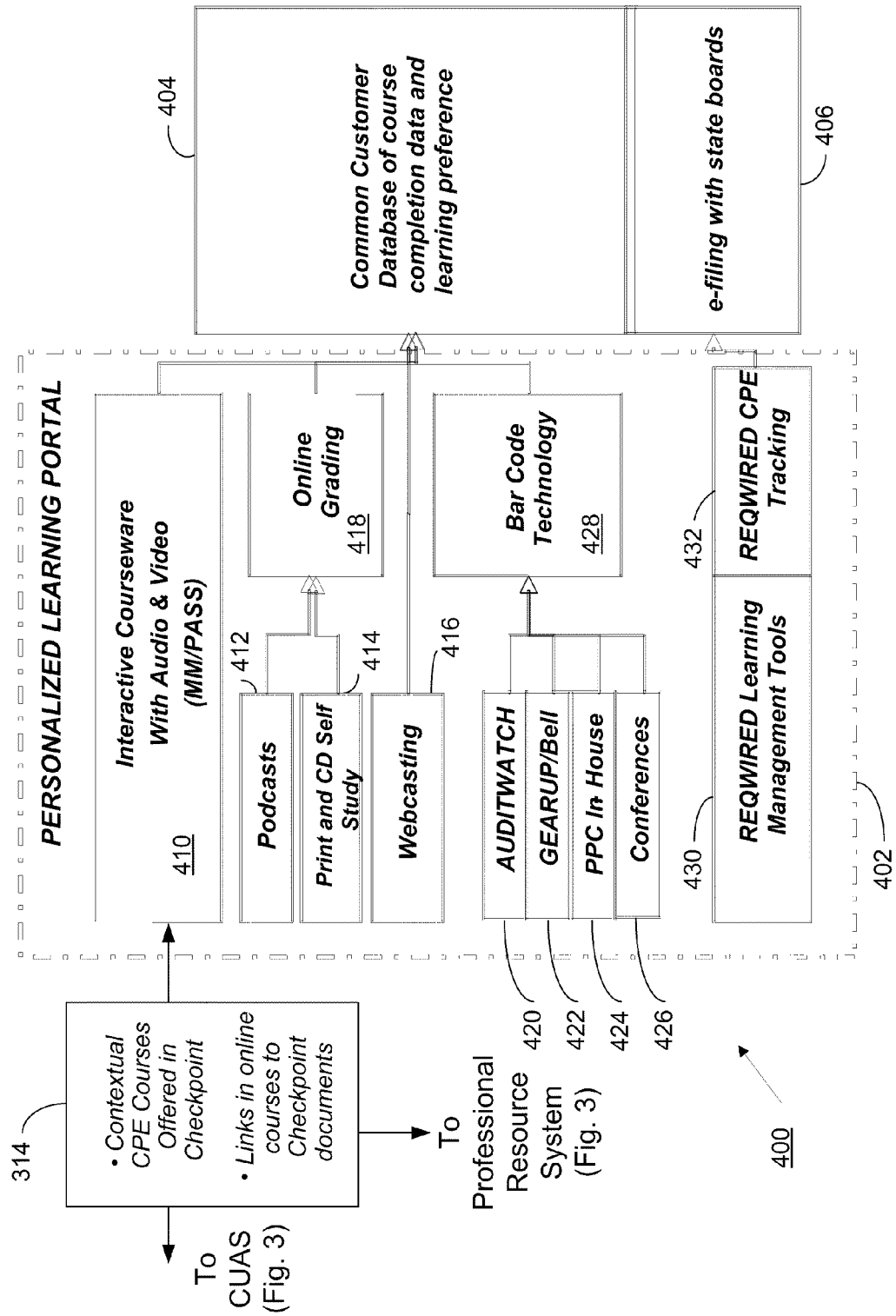
FIG. 4 is a schematic diagram of a personalized learning portal associated with the user authentication system of FIG. 3.

Referring now to FIG. 4, the learning interface system 400 comprises a personalized learning portal 402, which may be in the form of a homepage, window, dashboard, web portal, start page or the like. Portal 402 is preferably a browser-based user interface designed to organize and present links, data and information, RSS feeds, education service access points, etc., and is personalized based on specific user, firm or department related data and selections. In particular, and as discussed in regards to UAS 304 above, when a user, such as a user operating computer 108, has been granted access to multiple web-based services such as through an SSO process then the portal 402 can present a collective presentation and navigation access specific to that user. In this example, portal 402 includes an Interactive Courseware with audio and video component adapted to receive CPE courses, for example courses offered from MICROMASH and PASSONLINE. The Contextual CPE courses related via database structures or other suitable techniques may be selected for presenting to the individual learner by "clicking on" icons, links or other objects presented via user interface screens associated with the Practice Resource System 302 or for that matter the Practice Management System 104. Once selected, the Practice Management and Learning System 300 redirects or otherwise presents personalized learning portal 402 for viewing by the user. The association of learning tools and content with practice tools and content is "contextual" in that the learning and practice content are related, such as by having common subject matter in whole or in part. Examples are discussed herein below. A database structure is provided to handle associations of content with learning items, such as courses, and learning links.

Additional interface components may be included to provide individual learners with a variety of content delivery options, including podcasts 412, print and self-study 414, webcasting 416, Audit Watch 420, GEARUP/Bell 422, PPC In-house 424, and PPC Conferences 426. Online Grading 418 may be used in conjunction with the learning content delivery such as podcasts 412 and print and self-study 414. Online Grading 418 may be a stand-alone application that provides students the ability to take electronic tests for print-based self-study courses, including online exams related to a purchased product, such as a professional reference resource, that is separate from the purchase of the course itself, which may be given for free based on purchase or license of the product. Using Online Grading application 418 students may take a test online, receive their score and print their certificate during one or more login sessions.

Bar code technology may be used in conjunction with learning content delivery options such as Audit Watch 420, GEARUP/Bell 422, PPC In-house 424, and PPC Conferences 426. Portal 402 also includes Learning Management Tools and CPE tracking capabilities such as those offered by REQWIRED. Associated with presenting, delivering and completing education products and services, such as CPE courses, is reporting completion to appropriate authorities/jurisdictions associated with the individual learner so that he/she may receive credits in order to obtain or maintain licensing requirements and credentials. The learning interface system 400 includes e-filing component 406 to facilitate reporting of completed, qualified CPE courses by the individual learner to appropriate jurisdictions, such as state CPA authorities, to obtain recognition and credits toward CPE requirements of each such authority. E-filing component 406 preferably includes a mechanism for receiving confirmation of the reporting and credits awarded to the individual. E-filing component 406 may confirm not only CPE credits associated with courses reported by learning interface system 400 but also other CPE credits awarded based on reporting handled in other fashion, such as by paper reporting. Learning interface system 400 also provides a course history and learning preference component 404 that tracks courses completed or in various stages of progress toward completion and that maintains a individual's profile of learning preferences, e.g., learning content delivery media preferences (in-house, in-person, self-study, e-learning, conference, instructor-led training (ILT), etc.). The personalized learning portal 402 provides information associated with the user such as in the form of a dashboard to reflect requirements, progress toward satisfaction of requirements, credit hours needed/remaining, status of courses under way, status of learning path personalized goals, etc. Portal 402 may be organized by a series of tabs to focus the interface based on efficiently grouped topics or functions and may include, for example, links to education services systems and links to professional boards/authorities/societies. This is discussed further herein below.

Figure 5:
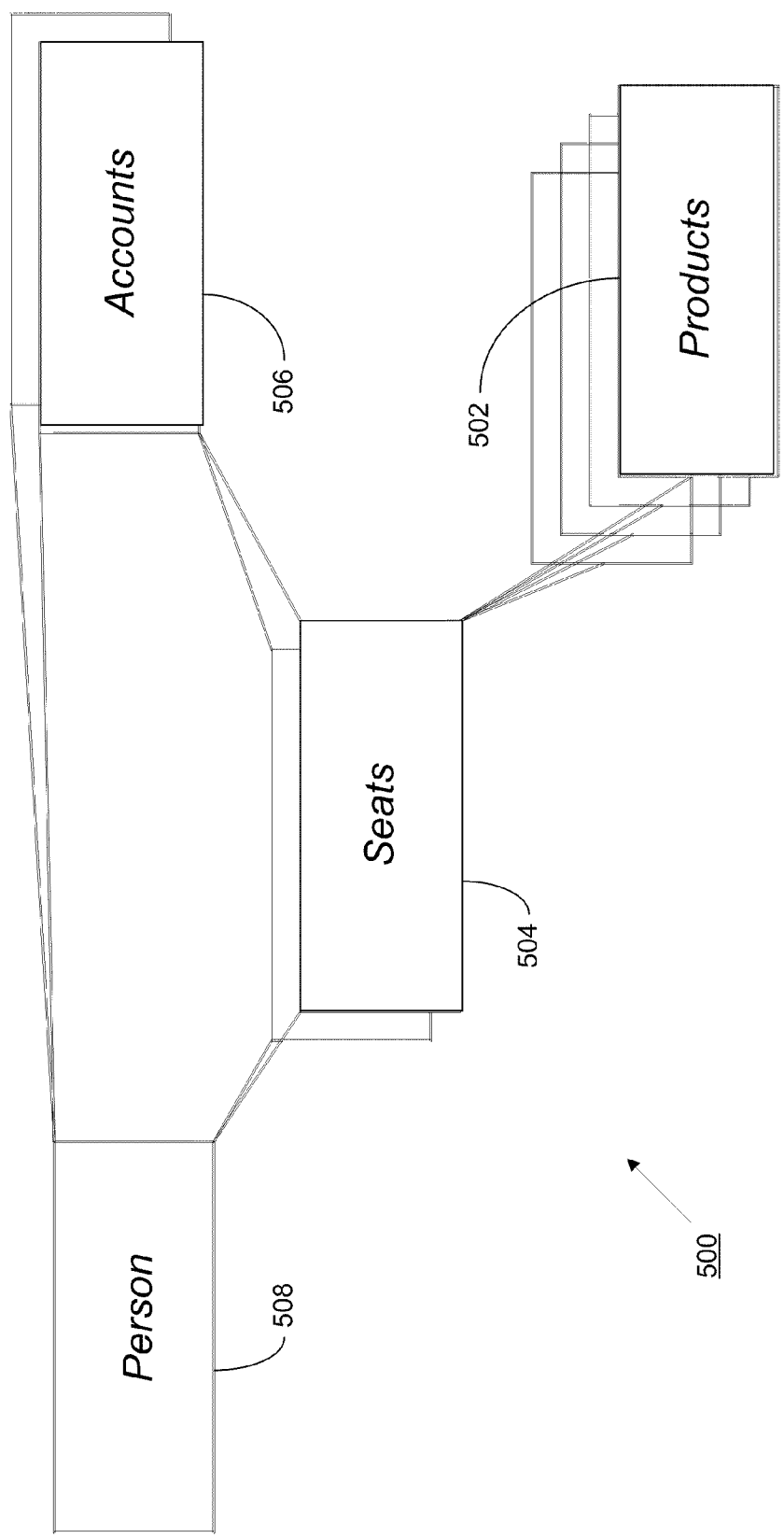
FIG. 5 is a schematic diagram of a database relationship structure for relating products, accounts, seats and persons.

FIG. 5 is a schematic of the database relationship structure 500 concerning relating, via a database, education and training related products 502 with "seats" 504 and user accounts 506 and ultimately to individual "persons" 508. A "seat" refers generically to an unidentified individual associated with some education service, request, product, etc. In one instance, "seat" is a "user slot" recognized by the UAS 304 and associated with an "account", such as an accounting firm using professional resource system 302. For example, if an Account purchases a product for ten (10) "users", that product may be associated to up to ten seats. A seat may be purchased but not assigned to a recognized Person or to a non-Checkpoint Learning Person. A seat may also be reassigned based on rules determined through an Account or firm contract or the sales package. "User" refers generically to a person using the various systems while "person" or "individual" refers to a particular person or user having a specific user profile unique to that individual. Associating actions, such as completed courses, with individuals is needed to properly accomplish reporting and credit tracking at the individual level. In conjunction with this the UAS 304, discussed above, facilitates user access to the various leaning services associated with the products 502 and seats 504. In one manner of operation, a firm administrator or the education services system assigns purchased products to seats and assigns purchased seats to persons.

Figure 6:
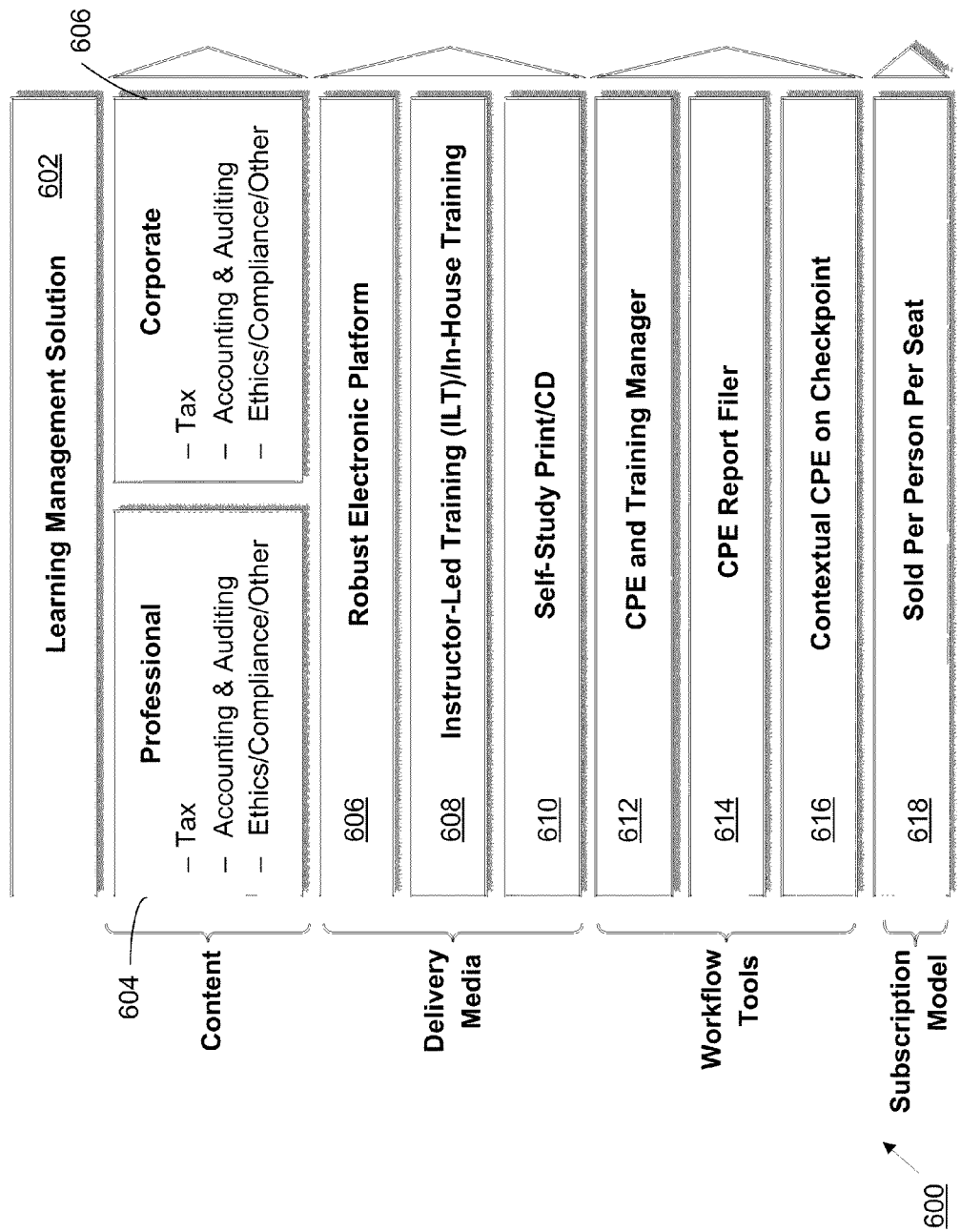
FIG. 6 is a schematic diagram of a primary education services system used in conjunction with the present invention.

FIG. 6 is a schematic illustrating a learning system 600 having a learning management solution (LMS) 602 directed to handling a comprehensive set of learning functions. In this example, LMS 602 is software-based and effectively manages learning content, delivery media, workflow tools, and subscription processing. In this example, the learning management solution 602 is associated with a CPA learning system and content may be segregated, with overlap, based on two types of CPA concerns, professional services entities and corporate entities. Both the professional services category 604 and the corporate category 606 include content related to, for example, tax, accounting and auditing (A&A), and ethics/compliance/other. However, because of the different environments and different needs, the content may be packaged differently and may be focused to meet the particular needs of the different type entities, e.g., internal controls and compliance associated with corporate departments may be more of a focus. The delivery media component of LMS 602 provides a blended learning solution by robust electronic platform 606, ILT and in-house training (IHT) component 608 and self-study component 610. Because persons have particular preferences as to how they prefer to learn and what fits best within their schedules, etc., LMS 602 provides a variety of content delivery media from which users may choose to learn. With ever-increasing bandwidth and storage have followed greater capabilities to offer and deliver dense video and audio content, including in real time. LMS 602 provides a platform, such as media players, real-time streaming, etc., to process video and audio content for efficient delivery for learning purposes while additionally associating such delivery with mechanisms to confirm completion, determine and present status, track historical information, attach course reviews and comments, link course materials to personalized portals, and facilitate reporting of completed courses to appropriate jurisdictions with identified individual names.

LMS 602 is adapted to interface with other professional resource applications to incorporate education-related workflow tasks into practice related workflows. In this manner LMS 602 embeds training into practitioner workflows. Again, this may be accomplished through use of database structures and relationships. In addition, education-specific workflows may be generated and education or practice administrators may have workflows to help manage an entity-wide education program. In this example, LMS 602 includes workflow tools to help implement CPE and training management 612, CPE reporting and filing 614, and contextual CPE in professional resource systems 616, e.g., CHECKPOINT. For instance, a firm education/training administrator may have workflows set up to help monitor learner progress against plan or path and to periodically prompt action associated with CPE requirements deficiencies. A workflow may result in a report being generated that lists individual users, e.g., employees, that are short on credit hours reported during a requirements period and having an upcoming requirements period cut-off or end date. The workflow may further include mechanisms with which the administrator issues warnings and/or directives to such individuals to prompt corrective action to avoid possible license-related problems. This also can be used to prompt early action to avoid increases in costs and to promote CPE relevancy by avoiding courses taken "last minute" simply to satisfy requirements and not more efficiently driven to address a more thoughtful professional development goal.

LMS 602 may provide users with the ability to create learning paths tailored to the individual's self-directed goals or aspirations or as directed by a firm based on anticipated future needs. Workflows may be used in creating and implementing such learning and career paths. The subscription component 618 of LMS 602 provides subscription related functions associated with CPE courses. For example, if a CPE offered by a particular education services provider is not covered under an existing contract associated with the user account making a request, then the user may be presented with a way to register and pay for the course. The system may be set up to disable selection of courses not covered under existing contracts or may offer alternative courses that are covered under existing contracts. The system may also provide availability information, e.g., number of seats remaining unsold.

Figure 7:
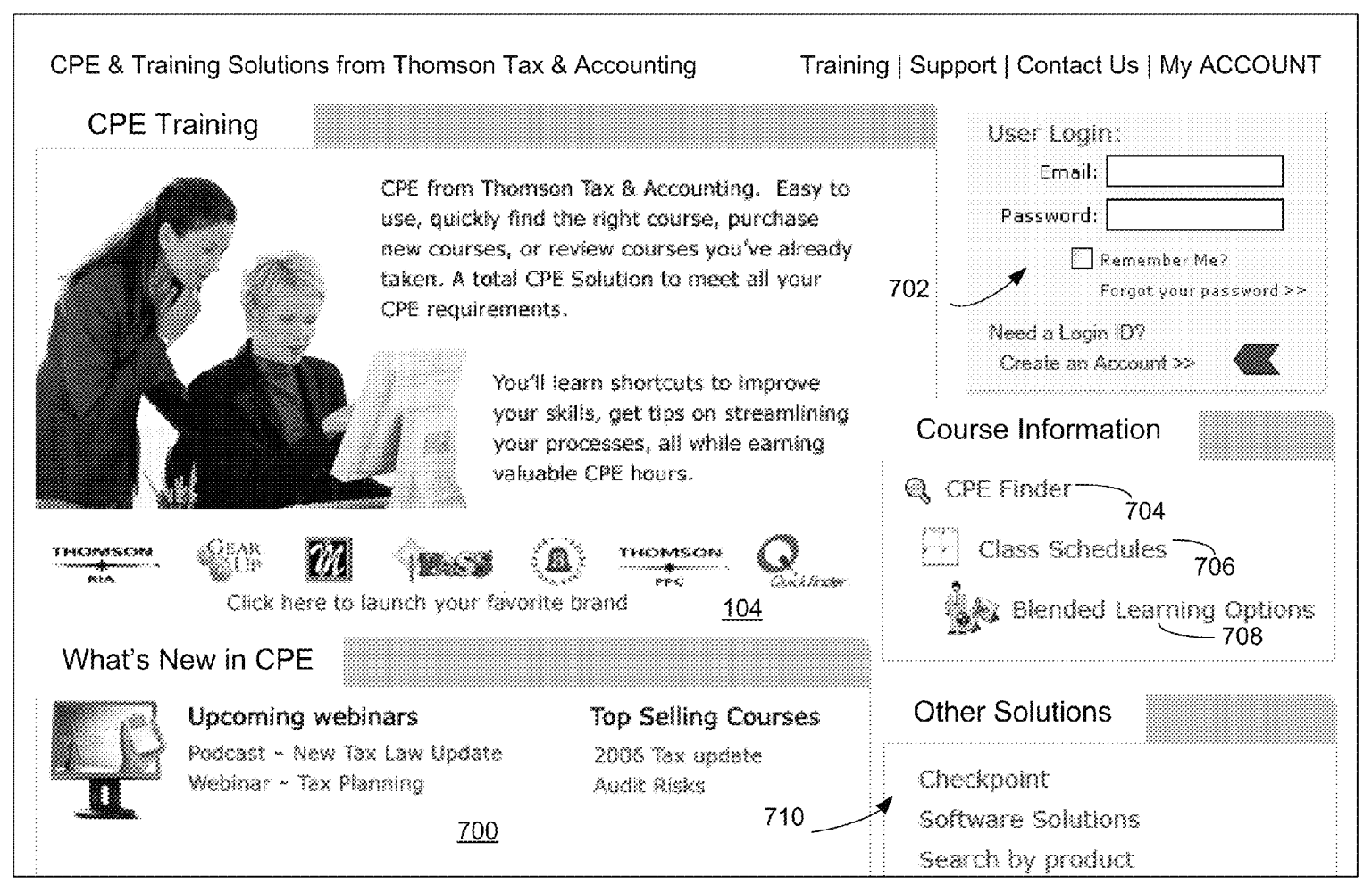

FIG. 7 depicts an exemplary initial login interface screen 700 associated with a CPE education system, such as primary education access system 125 of FIG. 1. A user is presented with a login interface 702 and, in this case, enters the user's email address and password. If the user does not have an existing account, then the user may create an account from this interface. CPE course information and functionality is provided in the way of CPEFINDER 704, class schedule/calendar 706 and learning options function 708. This screen provides the user with icons, which may include hyperlinks, for various education service providers or systems, e.g., RIA, GEARUP, MICROMASH, PASSONLINE, Bell, PPC and QUICKFINDER. In addition, links to other solutions, such as professional resource system CHECKPOINT, are provided at 710.

Figure 8:
FIG. 8 depicts a user interface associated with the user account creation process.
Figure 9:
FIG. 9 depicts a user interface associated with the user account creation process.

In FIG. 8, illustrates an account creation screen 800 in which a user account for an individual, "Roy Martin," is created by inputting information in fields presented. Also included in this user interface screen are professional practice related fields 802 for "Area of Practice (specialty)", "Type of Training I'm Most Interested in", and "# of Years of Practice Experience." FIG. 9 depicts a second user account creation screen 900 in which further information is collected from the user including "Practice Specialty" 902 and "Preferred Delivery Type" 904. In this example, the user has selected "Accountant" as the practice specialty with "Individual Tax," "Ethics," and "Management and Leadership" as areas of practice in which the user specializes. The user has also selected "Group Internet Based (Webinars)" and "Print-Based" self-study as the preferred delivery types for education content. Upon completion, the user clicks "complete" button 906 and the system creates a user account associated with that individual, in this example Roy Martin.

Figure 10:
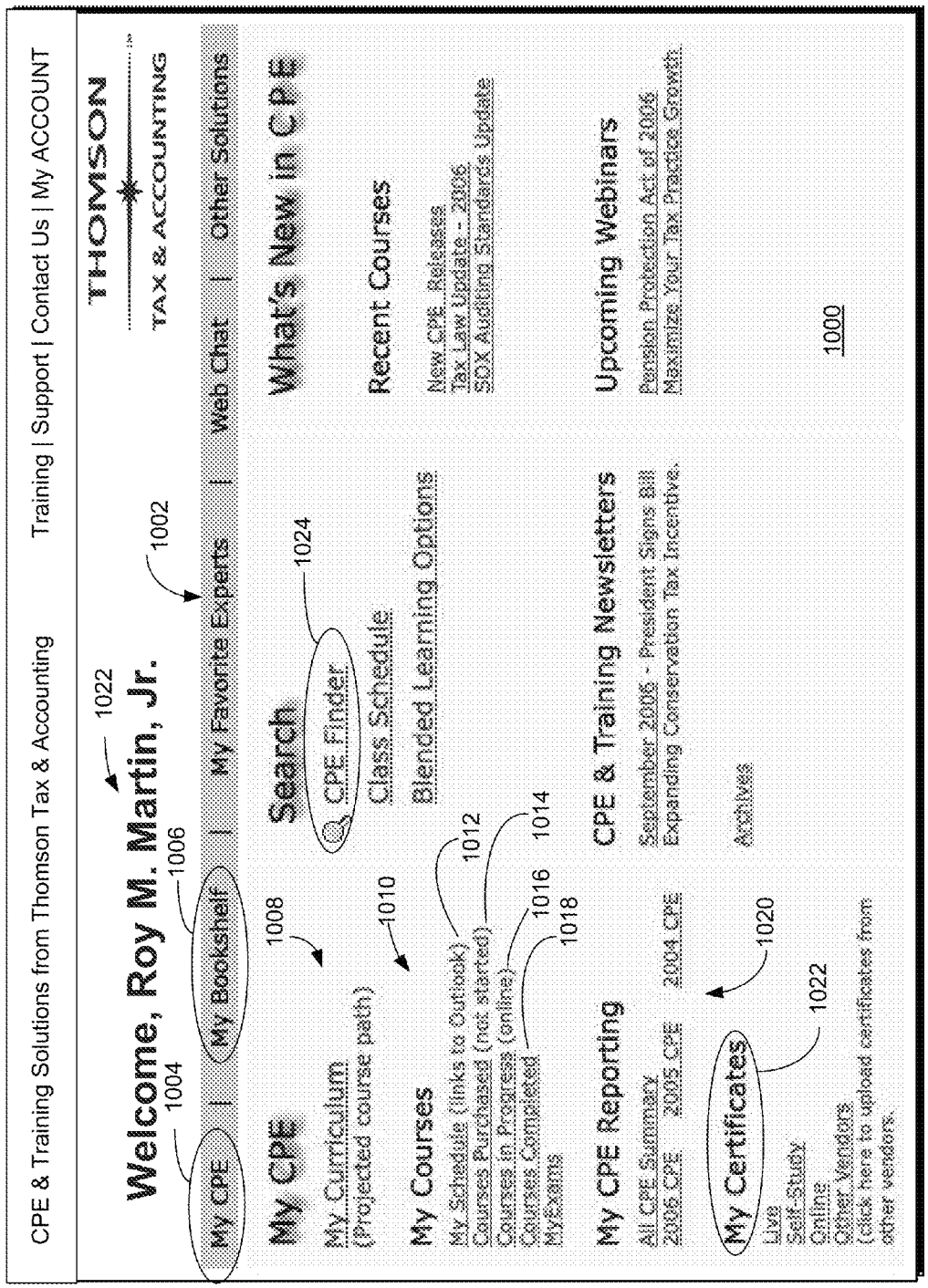
FIG. 10 depicts a user interface representing a dashboard for an individual user profile in conjunction with the present invention.

FIG. 10 depicts a personalized education portal or webpage 1000 associated with an individual user account, in this example for an individual named Roy Martin. The portal acts as a "one-stop" personalized navigator that presents user information and enables easy navigation to education and training related events and services as well as navigation to other areas. The "My CPE" homepage 1000 is presented upon login on the system or upon linking to the webpage via a professional resource application adapted to automatically, such as by way of an SSO process, enable access to this education services system and associated user interface. The personalized user interface screen 1000 includes tabs 1002, including My CPE 1004 and My Bookshelf 1006. The screen displays personalized content and links such as for My Curriculum 1008, My Courses 1010, My CPE Reporting 1020, and My Certificates 1022. User interface screen 1000 also displays Search functionality, including CPEFINDER 1024, CPE and training newsletters, and new CPE and training related offerings. Associated with My Courses 101 is My Schedule 1012 (see FIG. 15), Courses Purchased (not started) (see FIG. 18), Courses in Progress (online) (see FIG. 19), Courses complete (see FIG. 20), and MyExams. My CPE Reporting 1020 in whole or in part automates the reporting process. After completion of a CPE course, the system includes processes to implement reporting of the course to jurisdictions associated with the individual completing the course. The database includes user profiles and has associated with each individual that person's bar number or board number or other assigned number to facilitate both reporting of the course for credit to that individual to the one or more jurisdictions. Likewise, the system can confirm electronically that the jurisdiction has credited the individual with the CPE, CLE or other such credits, update the user profile and database to reflect the credit awarded, and present the information to the user via the dashboard 1000, which is an example of portal 402 of FIG. 4.

Figure 11:
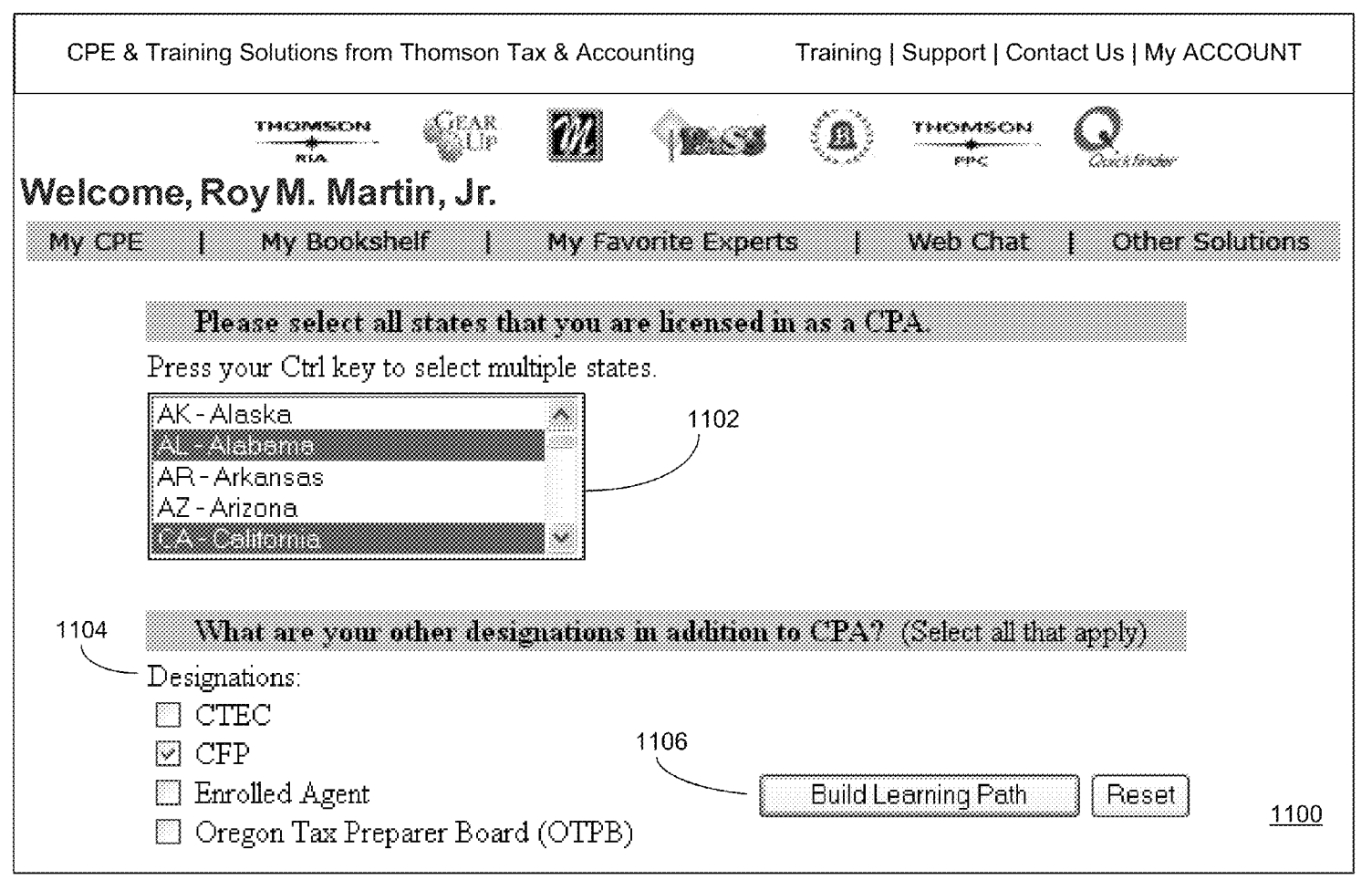

FIG. 11 depicts and exemplary page associated with My Curriculum 1008 from dashboard 1000. My Curriculum screen 1100 provides an interface for users to set preferences that allow the software to provide customized curriculum based on the user selections/input. Screen 1100 includes a data entry user interface 1102 for selecting one or more states or other jurisdictions in which the individual associated with the account. In this example, the screen relates to CPA licensure for user Roy Martin, who is licensed in Alabama and California. Additional professional designations are input at user interface 1104, in this example "CFP" has been selected as a professional designation associated with individual Roy Martin. By setting the appropriate states/jurisdictions and professional designations the system next determines what courses need to be taken by the individual, or at least that are suggested for taking. The user may click on the "Build Learning Path" button 1106 upon inputting all responsive information.

FIG. 12 depicts a user interface screen 1200 that represents a default learning profile based on personalized information provided by the user as well as requirements or other data provided by the entity, e.g., professional services firm or corporation. Default Learning Path Criteria are present in area 1202 including firm directed requirement "KPMG Required: Professional Conduct." "Area of Practice" corresponds to "Accounting", "Training most interested in" corresponds to "Accounting", and "# of years of experience" corresponds to "over 10" as selected by the user at screen 800 of FIG. 8. "Practice Specialties" corresponds to "Accountant, Individual Tax, Ethics and Management" and "Preferred Media" corresponds to "Webinars, Print-Based" as selected by the user at screen 900 of FIG. 9. "State requested" corresponds to the states selected by the user, Alabama and California and "Other Designations" corresponds to "CFP" as selected by the user at screen 1100 of FIG. 11. Links to other learning paths saved by the individual are also provided. The system provides functionality "Build New Learning Path" for the user to create and save user-defined learning paths and in this example three such previously created and saved paths are shown in area 1204.

Figure 13:
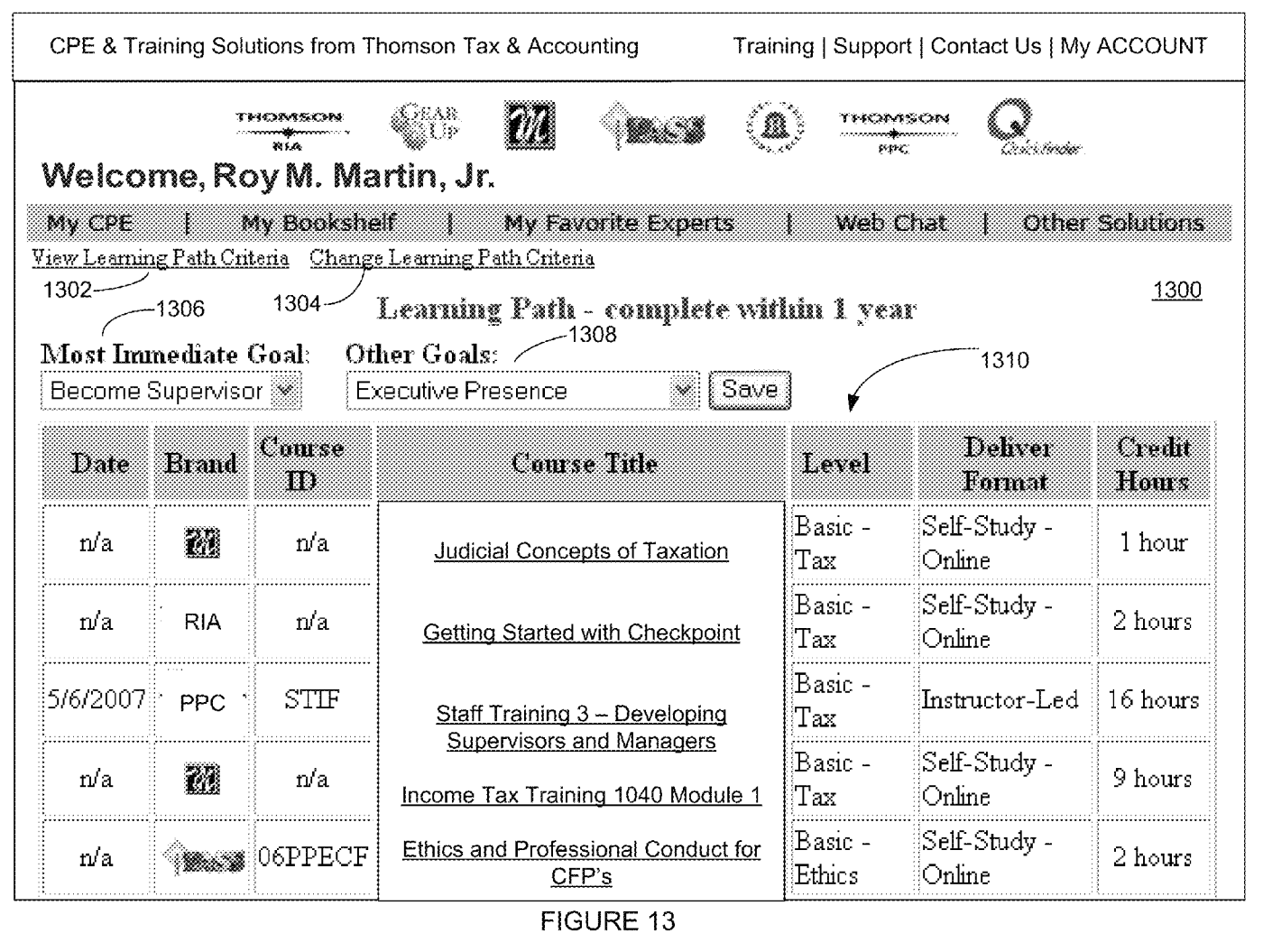

As reflected in the screen 1300 of FIG. 13, the system presents the user with a suggested learning path based on the user's learning profile that, for example, meets the user's short-term career goals. The suggested curriculum or learning path may be tailored to state requirements, job functions, and career path. In this example, screen 1300 presents a learning path comprising coursework to result in 30 hours of CPE credit for completion within one year short-term. From this screen the user may view learning path criteria via link 1302 or may change learning path criteria via link 1304. Immediate goal 1306 and other goals 1308 are provided to allow the user to enter and save user defined goals. The suggested learning path screen includes a listing of courses 1310 that includes information and links concerning the suggested courses. The system provides users with what appears to be a seamless, integrated education management system complete with links beyond the system to education service provider's products. This saves users significant time from having to search multiple education service providers to identify courses relevant to practice area and specialties in their practice and provides employers an efficient system to help shape, direct and track employee professional development. In addition, the system can display intermediate (e.g., 12-24 months) and long-term (e.g., 36-48 months) learning paths. FIG. 14 depicts a dashboard learning path screen 1400 that shows the status for each of the learning path courses, e.g., not started, not completed, completed, along with an overall status of the goal completion, e.g., 4 of 30 hours—13%.

Figure 15:
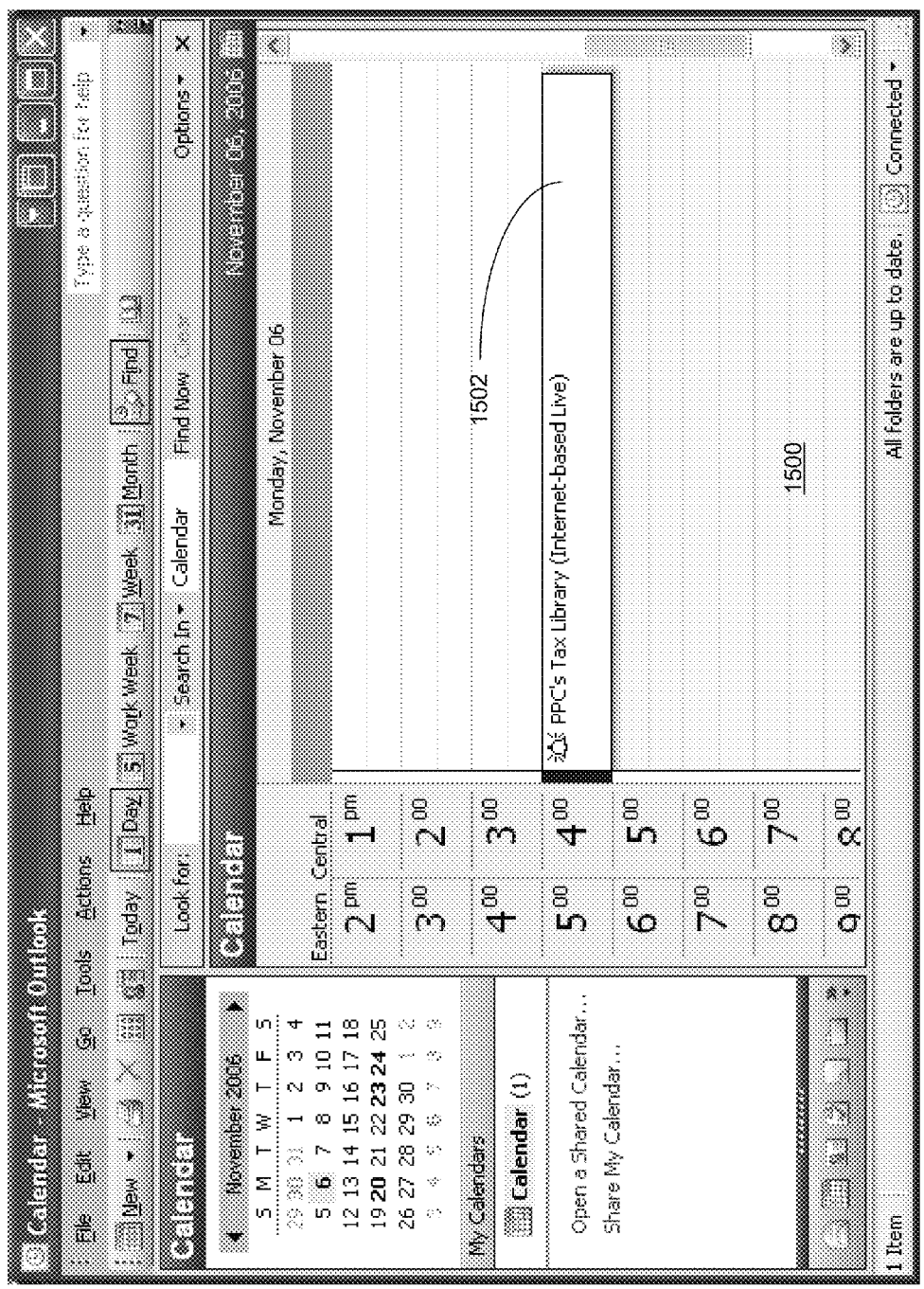
FIG. 15 depicts a screenshot representing an Outlook calendar with CPE course entry associated with a CPE course registered in conjunction with the present invention.
Figure 17:
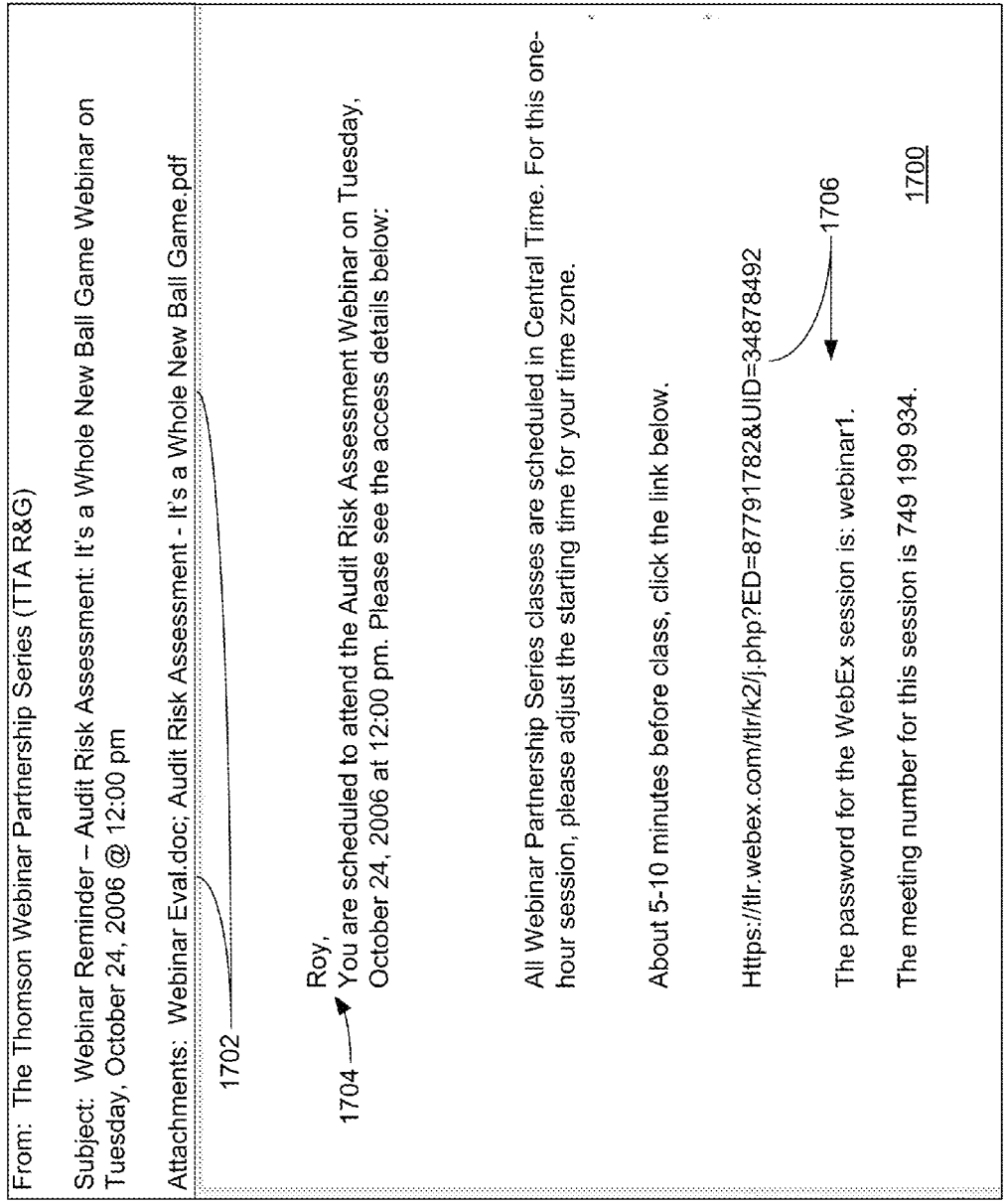
FIG. 17 depicts a screenshot representing an email message delivered to a user account associated with CPE course registration.

FIG. 15 depicts a screenshot 1500 of an Outlook calendar showing an entry 1502 associated with the My Schedule function 1012 of FIG. 10. The system is integrated with software applications such as Microsoft Office Suite including Outlook to automatically generate entries associated with individual profiles, e.g., calendar entries. In this manner the system facilitates integration of education and training services within an enterprise facility. In this example the user's calendar is updated to reflect a scheduled course, PPG's Tax Library (Internet-Based Live), for which the user has registered to attend. FIG. 16 depicts a screenshot 1600 showing a detailed appointment associated with the entry 1502 giving more information regarding the course and may include instructions necessary to complete the course, directions, links to materials and other resources associated with the course, the course instructor, the participants access information and other items of interest. In addition, as shown at FIG. 17, the system may generate automatic emails or other reminders, such as email 1700, at time of registration and/or periodically up to and following the date of the course. This message may also include attachments 1702, instructions 1704, directions, links to course and materials and access information 1706, and other resources associated with the course, the course instructor, the participants, and other items of interest.

Figure 18:
FIG. 18 depicts a user interface associated with a course progress function of the dashboard of FIG. 10.

FIG. 18 depicts a user interface screen 1800 associated with the Courses completed (not started) function 1014 of FIG. 10. A list 1802 of courses purchased but not started is presented with information about the course such as described hereinabove. FIG. 19 depicts a user interface screen 1900 associated with the Courses in progress function 1016 of FIG. 10. A list 1902 of courses purchased is presented to the user with a information concerning the score thus far achieved, expiration date for the course, number of attempts, and status with a link to retry the exam associated with successful completion of the course. The system generates a message 1906 to the individual user, Roy Martin, indicating that after completion of the listed course the individual has an additional 20 hours of CPE to complete in order to meet minimum requirements for a jurisdiction, in this case New York State Board of Accountancy. The system further generates and presents via user screen 1900 a list 1904 of recommended additional courses, preferably at least enough to meet minimum requirements and derived from information maintained in the user profile and/or learning path, for the individual to consider in meeting his requirements. Links associated with the recommended courses directing the user to the education services system of the provider of the respective course is provided to facilitate the selection and registration process. FIG. 20 depicts a user interface screen 2000 associated with the Courses Completed function 1018 of FIG. 10. A list 2002 of courses purchased and completed is presented with information about the course, e.g., score, hours, attempts, description, dates and status. The system generates a message 2004 to the individual user, Roy Martin, indicating that he has met the requirements for a jurisdiction, in this case the annual requirements for the New York Society of CPAs.

Figure 21:
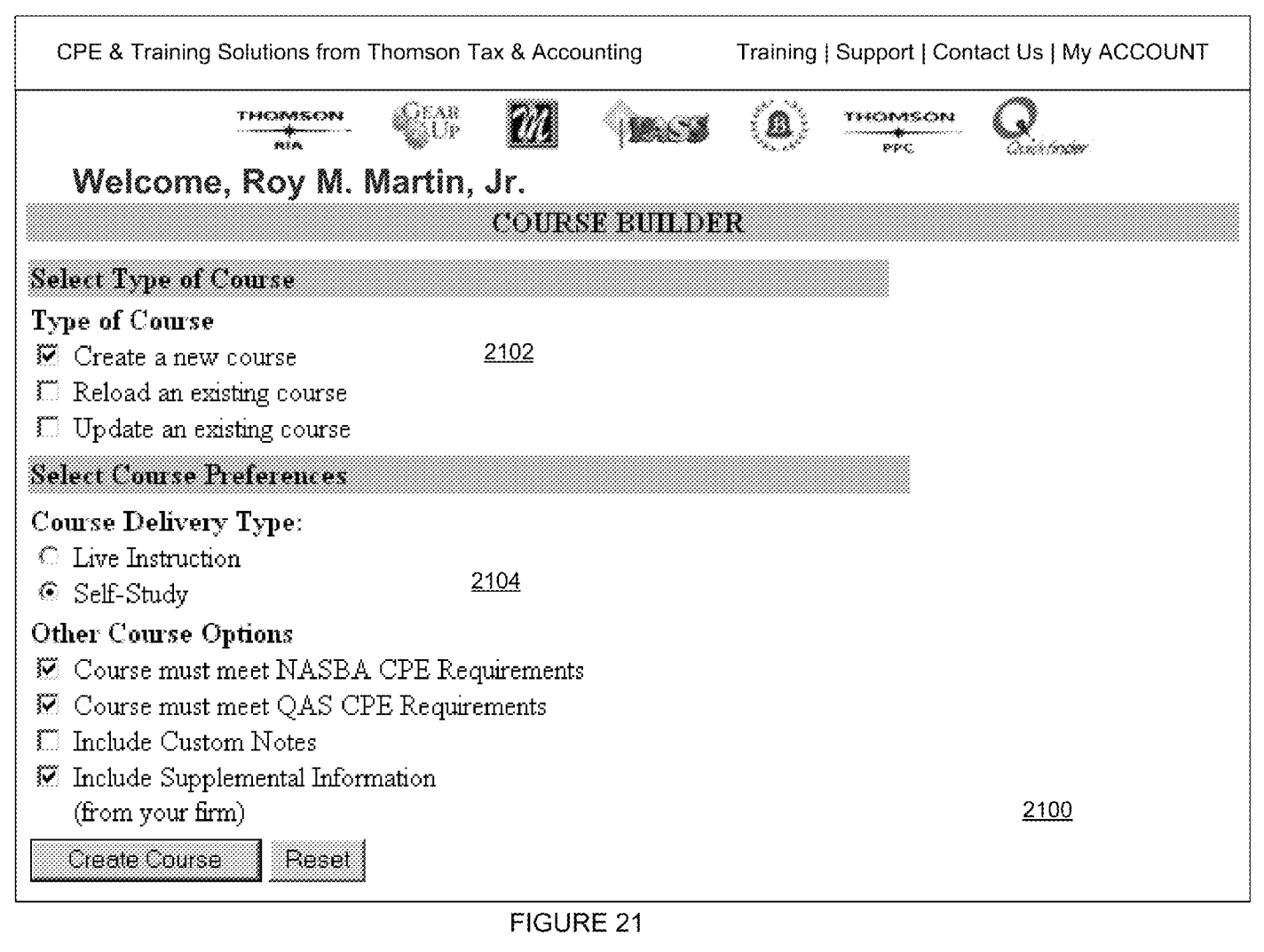

The education services system also may include an in-house, or otherwise, CPE course creation component. For example, FIG. 21 depicts a course builder user interface 2100, which may be available to administrators or to professionals who serve as instructors, but is not limited to such persons. Using the course builder interface, a user selects the Type of Course to create, reload or update at interface 2102 and selects course preferences at interface 2104. In this example, the user has selected to create a new course of the self-study type that meets National Association of State Boards of Accountancy (NASBA) and Quality Assurance Service (QAS) CPE requirements and that includes supplemental information such as information from the firm creating the course. For example, firms such as KPMG, PricewaterhouseCoopers, Ernst & Young, and Deloitte Touche Tomatsu may desire to create courses to present to clients and prospective clients or for professional conferences and may wish to include firm related information along with the technical subject matter as a way of promoting business development. In addition, the course builder function may be used by traditional education services providers, such as MICROMASH, PASSONLINE, RIA, PPC, etc., to develop course offerings and such providers may desire to place information about the provider in the course materials.

FIG. 22 depicts a course loader user interface 2200 that includes a content loading interface 2202 for loading previously developed content, such as questions, quizzes, exams, etc., into the course being created. User interface 2204 allows the user to import content, for example existing files, for use in the course being built. Such files may be previously developed for general use, for use with prior courses, or generated by the user for use in the new course. The user uses the browser function to locate and attach the file to the course or course record. An additional feature allows the user to generate questions based on keywords found in the course materials. This may be accomplished in a number of ways, for example by selecting from previously developed questions associated with certain topics, e.g., Sarbanes-Oxley Act, regulatory provisions, standards sections, etc., or by locating in the materials key words for testing and deriving questions based on the search.

Figure 23:
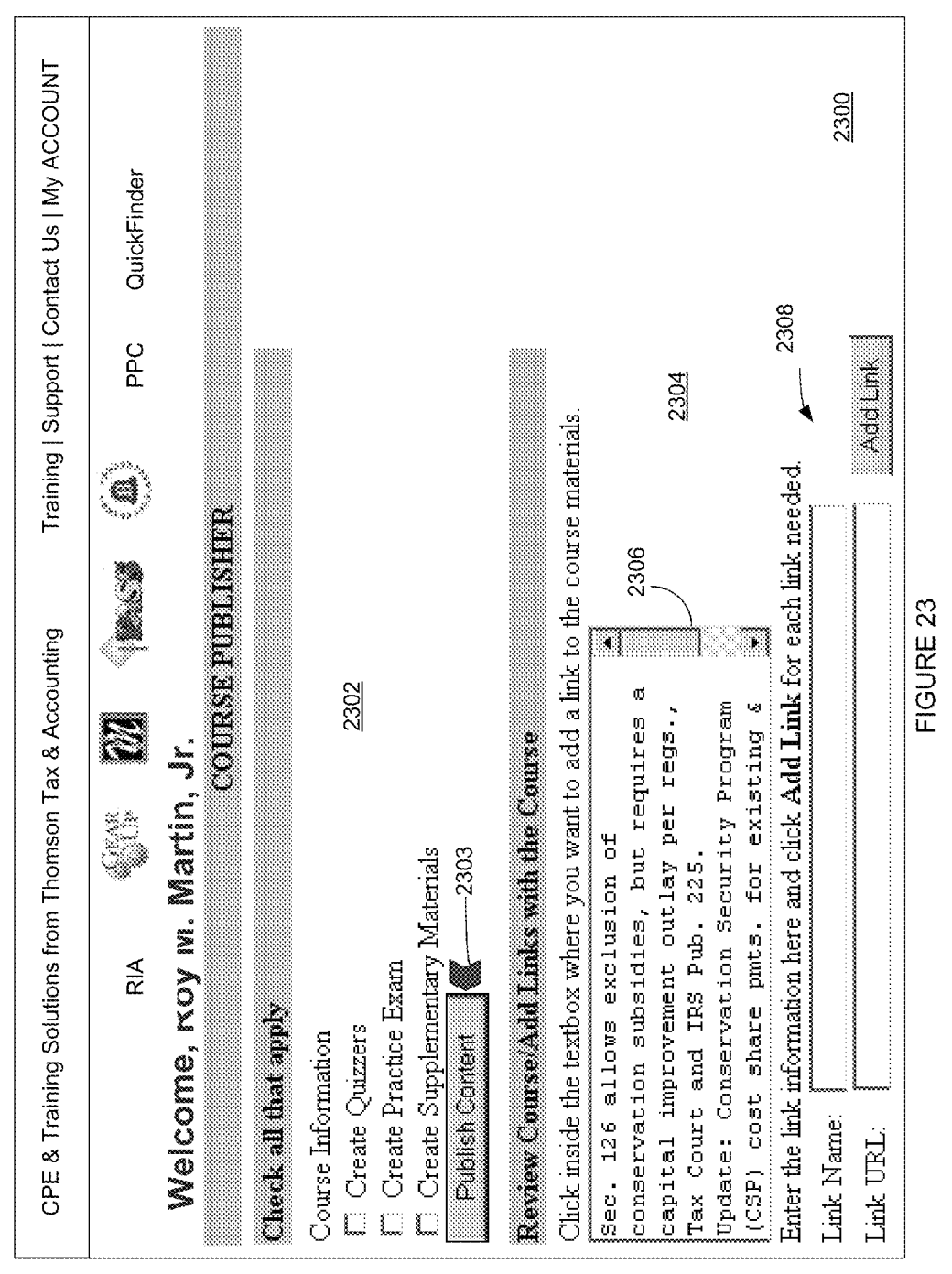

FIG. 23 represents a course publisher user interface 2300 for publishing the course being created using some medium or media. In this example, user interface 2302 enables a user to select from creating quizzes, practice exams, and supplementary materials for use with the course. User interface 2304 includes a textbox 2306 and link name and URL fields 2308 whereby, for instance, a user may add links to course material.

Figure 24:
FIG. 24 depicts a user interface associated with a supervisor student progress function of the dashboard of FIG. 10.

FIG. 24 depicts an administrator screen 2400 associated with a particular user, Brian Hall, for instance a learning supervisor or administrator, for viewing the progress of students/learners via the learning system. The administrator is associated with a set of students/learners via a database and is presented with the assigned set of students when viewing this page. In this example, students or learners associated with Brian Hall as supervisor or administrator are Roy Martin, Mark Schlageter, Bill Smith, and Jane Jones. Rather than associating individuals with a supervisor, the system may associate the supervisor with a particular department, business unit, area of specialty, location, etc. In this exemplary screen, the supervisor is presented with the following progress information, % complete, hours completed, hours in progress, and hours not started. This progress may relate to an established learning path associated with each individual. Upon selecting a particular student, the system will present to the supervisor more detailed information concerning that student. In addition, the system may present administrators or supervisors with metrics or measures of learners against peer group data or historical peer group data to better enable comparison and identifying areas of success and deficiency. The system may be set up to deliver e-Alerts to individuals with copy to supervisor for impending licensure and other deadlines.

Figure 25:
FIG. 25 depicts a user interface associated with a CPE reporting function of the dashboard of FIG. 10.

FIG. 25 is an exemplary user interface screen 2500 associated with the My CPE Reporting function 1020 of FIG. 10 and the electronic report filer aspect of the education services system. The system records CPE credits from education services providers and automates in whole or in part the process of reporting the CPE credits to jurisdictions. In this example, the screen is associated with an individual user, Roy Martin, and includes a CPE history in the form of summaries of CPE hours for years 2004-2006, 2502-2506 respectively. The year-by-year summaries may be expanded, 2504 and 2506, to reveal the particular courses taken and completed by the individual and the number of hours for which credit was received as well as additional information. The system generates a message 2508 to indicate for a given jurisdiction and/or time period the status of meeting requirements associated with renewal of professional licenses. The summaries can also be by state, where the user is licensed in more than one state or jurisdiction. The user interface 2500 provides a mechanism for printing CPE license renewal report to assist in filing of the CPE license renewal reports. Preferably, the system employs a method for connecting with licensure authorities to electronically e-file license related reports and documents for license renewal.

The education services system includes a CPE search function or interface, shown as CPEFINDER 1022 in FIG. 10, whereby a user may search one or more databases/education services providers from the MyCPE portal. FIG. 26 represents a screenshot 2600 depicting the results of searching in the field associated with CPEFINDER 1022 of FIG. 10 with the term "retirement." In this example, nine documents were uncovered in the search. For each of the courses identified by the search, the system lists the following information, Brand, Price, Print, Comp, ILT, Inhouse, and Hours. Links are provided with at least some of the courses presented to enable the user to link directly to web pages that describe the courses in greater detail and provide additional information for registration.

FIG. 27 depicts a user interface screen 2700 representing the CPE dashboard link—My Bookshelf, tab 1006 of FIG. 10, webpage associated with an individual's account, in this case Roy Martin. This interface allows users to retain course related information for later reference and use. In this example, course materials for three tax related courses, one accounting related course, and one auditing related course are made accessible to the user. A user can select a desired course material, e.g., Tax Update 2006 2702, by clicking on the link. The browser will open a window for presenting, in this case, an Adobe document in .pdf format.

Figure 28:
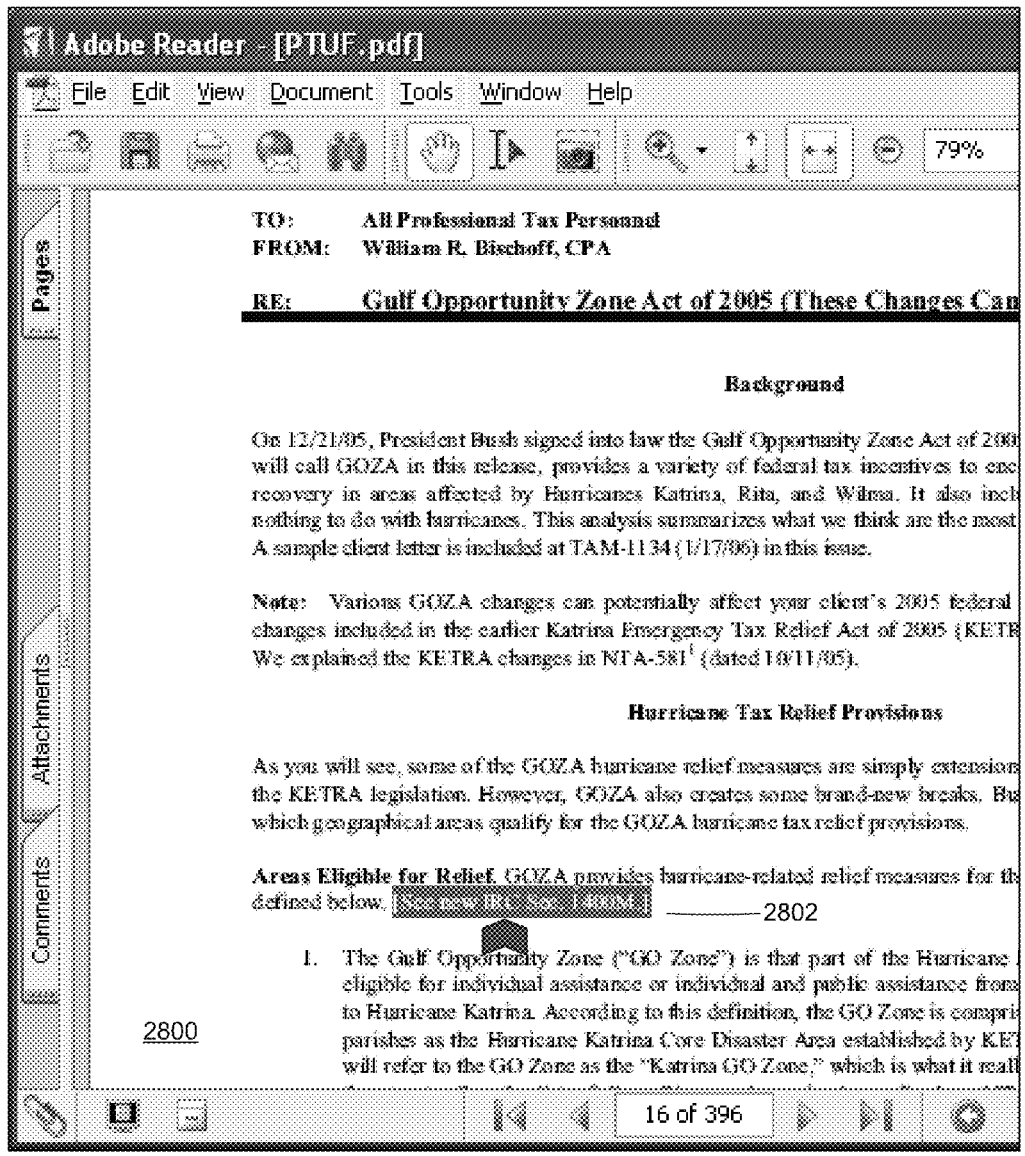
FIG. 28 is a screenshot of a document having embedded links for linking between the education services system and a professional resource system in conjunction with the present invention.

FIG. 28 depicts a screenshot 2800 showing one page, 16 of 396, from the document 2702 selected in FIG. 27. In this manner a user can search course manuals and other materials for specific references to, for instance, an IRC code of interest and find links to information available from other sources related to that subject. In this example, the course document includes a link 2802 to take the user outside the learning system and to a professional resource system or a document from such system, such as CHECKPOINT, to view information concerning the subject of the citation or other item linked. Links in course materials, including online courses and materials, may be made to, for instance, primary source materials, PPC Guides, etc. In this case the citation is to IRC (Internal Revenue Code) Sec. 1400M and the link connects the user to the professional resource service, e.g., CHECKPOINT, to review the information found at CHECKPOINT. This may be in the form of opening into a new window.

Figure 29:
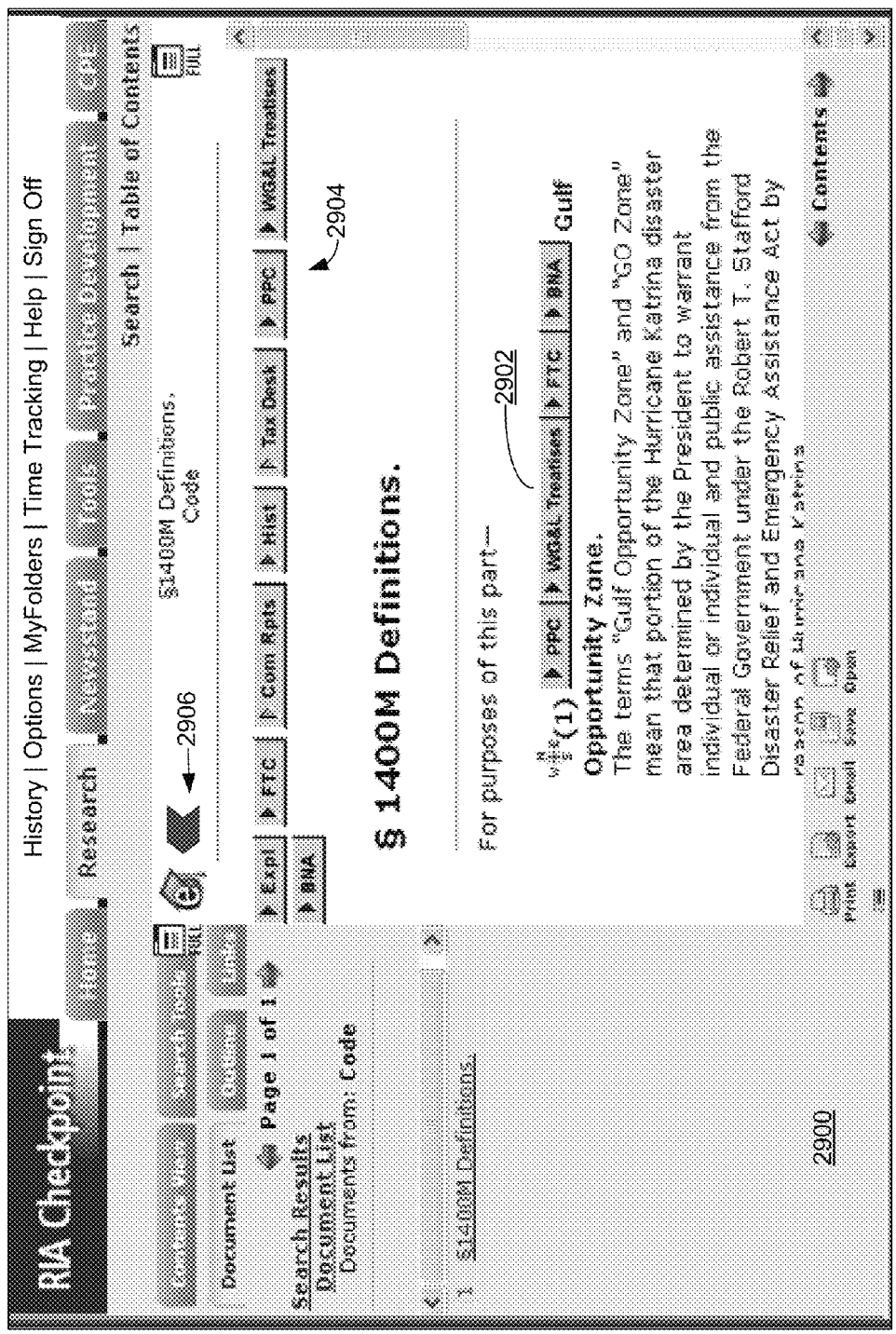
FIG. 29 depicts a user interface representing a resource page associated with the link of FIG. 28.

Clicking on a resource link, such as link 2802 or a link in an online self-study course, connects the user to the professional resource service system, which presents the user with the screen 2900 of FIG. 29. As can be seen, the screen 2900 presents the user with information concerning the subject, Sec. 1400M, linked from the course material and is generated by the professional resource service system as a research page. This direct, seamless transition may be accomplished by the use of SSO or other suitable techniques. Screen 2900 includes a series of links 2902 that may be used by the user to connect to other resources and services for additional information and research concerning this topic. Links or buttons 2904 may be used to directly connect with the other resource service providers. As can be seen from this screen, the professional resource system includes a CPE tab to present the user with an education focused web-page, such as the personalized portal discussed hereinabove. An education icon 2906 is provided to enable the user to return to the CPE course materials page of the education services system. If the link, such as link 2802, leads the user to a service or resource not under contract with the user's firm or company, then the system may automatically offer the user the option of purchasing the service or resource, give guidance as to how to acquire the materials, or give guidance as to who to contact within the organization to inquire into obtaining the materials or service.

Figure 30:
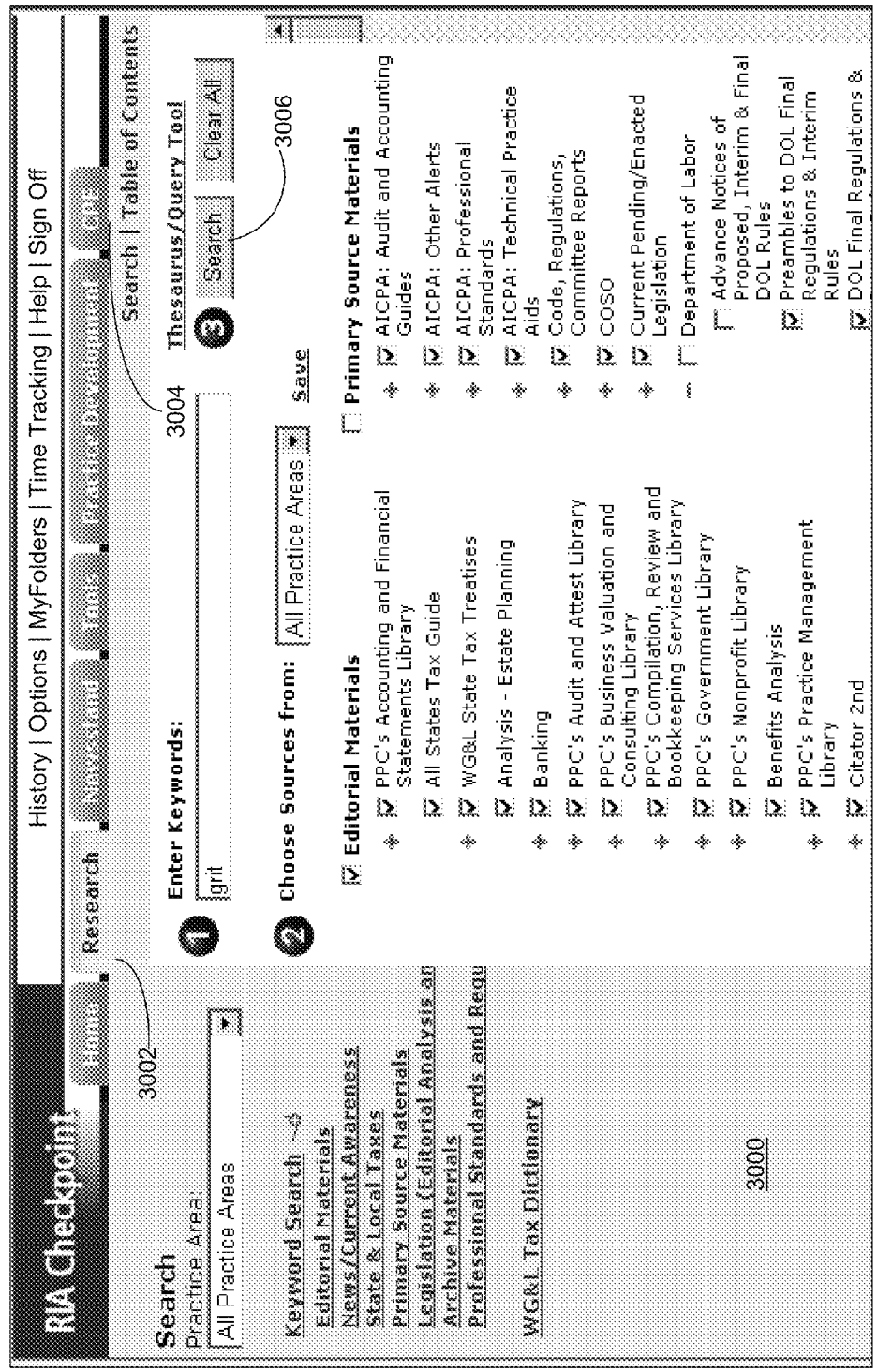
FIG. 30 depicts a research user interface associated with a professional resource system for generating document that have embedded education-related links in conjunction with the present invention.
Figure 31:
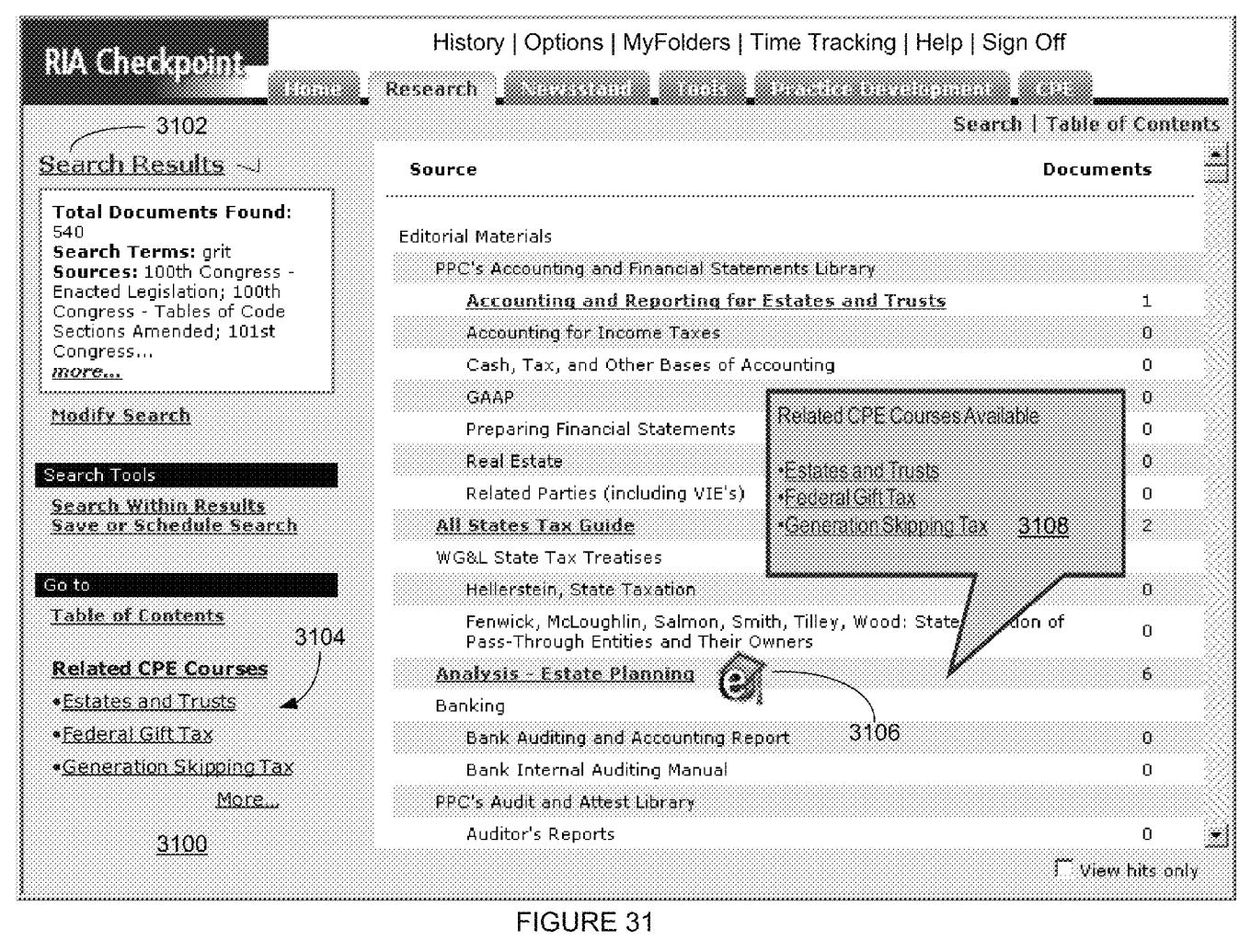
Figure 32:
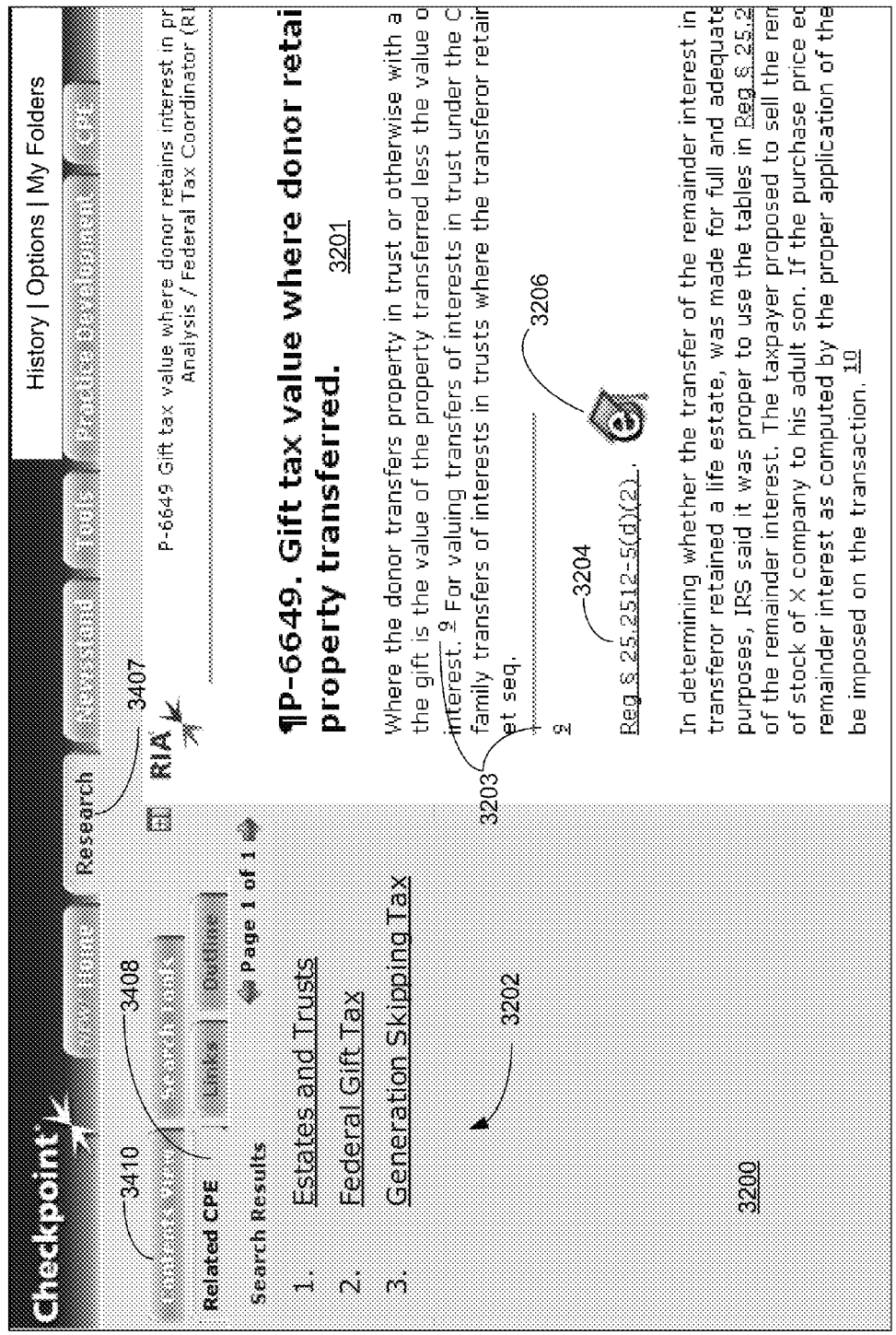
FIG. 32 depicts a research user interface including a document from the search results of FIG. 31 with education-related links.

FIGS. 30-32 illustrate the interfacing and integration of the education services system with the professional resource system to provide "contextual" CPE services, what is in essence immediate CPE and training contextualized to address current research problem. In addition to accessing professional research resources from within the education services system as described above, a user can likewise enter the education services system from a professional resource system. This relates more directly to the system shown in FIG. 2 and described in the associated description above. FIG. 30 illustrates a search page and the process for conducting a search using the Research function 3002 of a professional resource system, e.g., RIA CHECKPOINT. From this search page a user can 1) enter a search term, such as "grit" (Grantor Retained Income Trust) for example, 2) select from among sources available to the user for searching based on practice area and selecting/deselecting from a list of editorial materials and primary source materials, and 3) click on the "search" button 3006 to launch the search. FIG. 31 depicts a screenshot 3100 that illustrates the results 3102 of the search of FIG. 30. In this example, CPE related content is indicated by the graduation cap icon 3106. Rolling the cursor over the icon can reveal a list 3108 of related CPE courses that are available for reviewing by the user conducting the search for consideration of registering for a CPE course related to a subject that the individual is researching. In this manner the integrated professional resource and learning system can facilitate context-based CPE. In addition to or in the alternative to the list 3108, the list 3104 may be presented to the user on the screen 3100. Clicking on the list may reveal a course listing or description and this may be accomplished by opening into a new window. The user may then navigate to the education services system to further investigate the CPE options related to these subjects. In addition to the search screens, FIG. 32 depicts a screen 3200 that displays a research document 3201 from the search results. A footnote 9 3203 in the text of the document 3201 is related to a citation 3204 and a link to that citation 3204 is provided. In addition, an education icon 3206 is provided that indicates to the user that learning/CPE content or courses related to the citation and related text are available to the user. Under the "Research" tab 3207 is included on the left hand panel a "Related CPE" tab 3408 that includes links 3202 to related CPE or learning courses and/or content. The user may click on one of the set of links 3202 under the "Related CPE" tab 3408 to display course related information. The course related document, either for a particular course or set of courses related by topic, may be displayed in the form of a separate window generated by an education services system.

Whether migrating from the education services system to the professional resource services system or vice-versa, the relationships between education (CPE courses and training content) and practice resources (practice guides, research documents) are maintained by database structures and therefore updating content on either side to reflect changes in regulations, legislation, standards, etc., are automatically achieved. This structure enhances the system's ability to be flexible and responsive to changes affecting professional practice.

Discussed herein has been the use of database structures to provide in essence cross-coupling of data and linking across tables and fields in one or more databases. Using SQL for managing data and for schema creation and modification, a relational database management system (RDBMS), for example MySQL®, runs on a server and provides multi-user access to one or more databases for searching, accessing, and processing data and records and may be used in web-based applications. MySQL runs on a wide variety of system platforms including LINUX®, UNIX®, Microsoft WINDOWS® and VISTA®, SYMBIAN®, OS/2®, and others. GUI administration tools such as MySQL Administrator, MySQL GUI Tools, phpMyAdministrator and other tools provide administration of MySQL systems. These tools support a wide range of operations with MySQL. Commonly used operations that are supported by the user interface include managing databases, tables, fields, relations, indexes, users, permissions, and many others.

A primary key (PK) is used to uniquely identify each row in a table and may be made up of multiple fields, i.e., a composite key of more than one column for uniqueness and to enhance speed of query processing. Storage engines, including InnoDB, may be selected based on table requirements and allow functions such as transactions and foreign keys (FK), which may reference primary keys (PK). FKs are used as a referential constraint between two or more tables by identifying a column or a set of columns in one or more "referencing" or "child" table(s) that refer to a column or set of columns in a "referenced" or "master" tables so as to establish a "one" (master) to "many" (children) relationship. In this manner FKs link information across tables, can establish cascading relationships between tables, and provides DB normalization. Other techniques may be used in establishing a DB structure to implement the invention including alternate keys, candidate keys, unique keys, compound keys and superkeys.

In accordance with the present invention, course mapping onto resource and content and other learning services databases may be accomplished using a spreadsheet, such as using Microsoft Excel. In the example of Table 1, below, permalinks, such as URLs, that link to courses having associated Course ID numbers, are associated with chapters or particular sections of professional resource related content, such as practice guidance materials. The links are then embedded in the content and/or table of contents associated with the reference materials and may also be associated with and presented using user interface web pages presented when displaying the content. As shown and described in the various examples, users may click on the permalinks to access the learning related content directly from the professional resource material or webpage.

The permalink is the point of origin for the documents in the professional services resource system, such as CHECKPOINT, and in essence allows access to the URL of a specific document. In one manner, the first step in associating permalinks with URLs and documents involves searching and identifying objectives, key words or phrases from the summary or content of materials of each course. The results of this search provide a reference for determining association with the reference materials. The second step is to perform a search of the table of contents of the reference material, for example, using key words or phrases found in the first step. The third step is to associate, such as using the Excel spreadsheet, the course ID and permalink associated with the course with the table of contents. Upon uploading the Excel spreadsheet in the professional resources system database, the course ID and permalink are then associated with the table of contents. In this manner, when the professional resources system displays the table of contents, such as under a "Research" tab related to the resource materials after a search performed by a professional conducting research on a related subject, the user interface of the professional resources system will also display an icon or list or other indicia indicating that learning course or content related to the document/subject is available.

Using the example of FIG. 32, a table of contents for research related document 3201 may be displayed upon selecting the "Contents View" tab 3410. This view will generally be reflective of the "Chapter" listing of the associated Excel spreadsheet uploaded, e.g., Table 1, and include links reflective of the permalinks assigned to the sections of the document that make up the table of contents. This may be in the form of icons located close to the respective parts of the table of contents and/or on a left-hand panel similar to the set of links 3202. Upon a user selecting a displayed course link, the system may either direct the user interface to a new screen representing the course selected or may open a new, separate window related to the selected course for further action by the user, e.g., registering for the course, paying for the course, reviewing table of contents of materials related to course, reviewing subjects covered by the course, and other information such as form of delivery, source of course, instructor, course description, location, etc. FIG. 33 illustrates an exemplary course offering screen 3300 that could be displayed following a selection of a link as described above.

TABLE 1

| Course ID | Permalink | Chapter-resource content |
| --- | --- | --- |
| CLQABA | https://dev.checkpoint.thomsonreuters.com/app/toc?begParm=y&appVer=8.7&permaId=e2b631e2e5ef5a78141317802d368007&permaType=toc&endParm=y | ii. Chapter A-7000 Alternative Minimum Tax |
| CLGAI9 | https://dev.checkpoint.thomsonreuters.com/app/toc?begParm=y&appVer=8.7&permaId=013b556086655bf61db2b6a856b59a79&permaType=toc&endParm=y | xvi. Chapter I Sales and Exchanges, Capital Gains and Losses, Cost Recovery Recapture, Depreciation Recapture |
| CLQABA | https://dev.checkpoint.thomsonreuters.com/app/toc?begParm=y&appVer=8.7&permaId=c03e10e80801359e7c555aa15719e1c1&permaType=toc&endParm=y | Alternative Minimum Tax §§55-59 |

The system also provides a way to display a plurality of courses related to a reference document or a section of the table of contents related to the document or a general set of "Related CPE" courses that relate to a subject matter or field. For instance, upon a user selecting a link to related CPE courses, the system may, as shown in the screen shot of FIG. 34, display a set of CPE courses related to the document or subject for consideration by the user. The set of courses shown in the example screen shot of FIG. 34 includes four courses numbered 1-4. The information provided to the user includes the source of the course, e.g., RIA, QUICK-FINDER, PPC, the delivery form a of the course, e.g., print based self study, the number of hours of CPE credits, the price, the field of study, the title of the course, and links to additional information and materials. In addition, the learning interface also provides links to additional training solutions, brands, resources, etc. The learning interface also provides a search function to enable the user to search for additional learning options using keywords.

Figure 34:
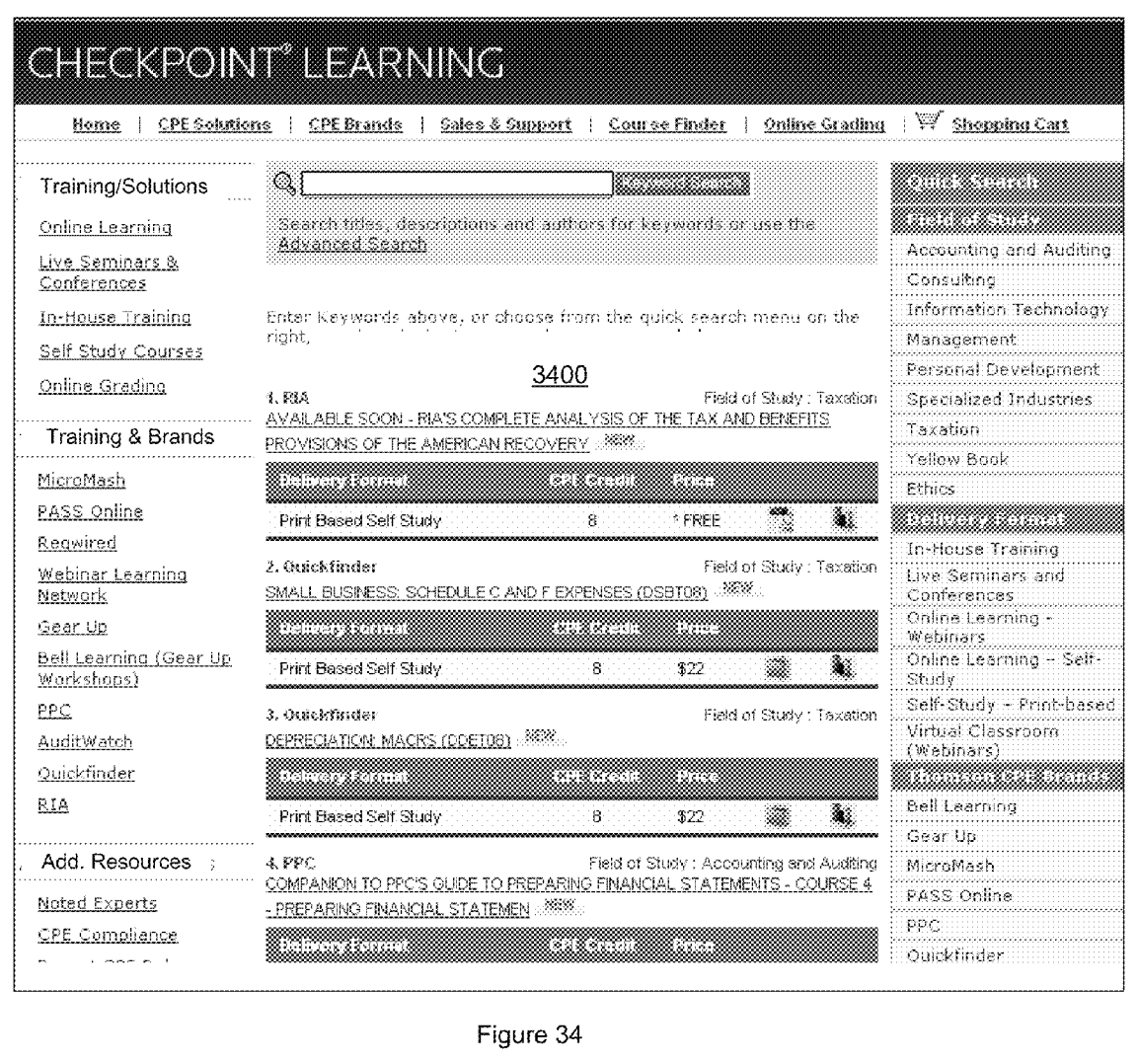

In the examples of FIGS. 33 and 34, the professional resource service, e.g., CHECKPOINT, that generated the research search results displayed in FIG. 30-32, directed the user to a related or co-branded professional learning system, e.g., CHECKPOINT Learning, to present learning content to the user. This is an example of the operation of the Professional Resource System 202, with Reference and Guidance Component 216 and Professional Learning component 224 as described above in reference to FIG. 2.

In addition to the use of permalinks and manual tagging of content with course related links or vice-versa, the professional resource service may utilize tagging or auto-tagging techniques to add links and citations to courses or course materials in research reference content. Auto-tagging allows the system to automatically create links for all citations recognized by the professional resource service tagging feature. A variation of this is to use an identified auto-tagging in which specific citations are selected and marked within the course content to be recognized by the system tagging feature.

One aspect of the professional learning system is the ability to create content or to modify existing content for use as course or learning materials. For example, the professional learning system may utilize an interactive courseware editorial tool, e.g., MICROMASH Editor that allows creation and modification of interactive (online) courses in an XML (XMetaL) environment. An interactive course is one delivered electronically and that includes technology that allows the student to interact with the learning environment. The system may be used to set up special users with a particular set of roles that include access to documents and tools to permit creation and editing and inclusion of linking information into database structures to facilitate the displaying of course related links in research reference documents and related searches. For instance, the system may establish certain users as "editors" for creating and editing "tagged" documents. The system may be used to create a citation text link, i.e., a link that uses the CPE course text, which is already part of the course content, as the link to a reference document, e.g., a document resulting from a search conducted using CHECKPOINT. The system may be used to create a non-citation text link, i.e., a link which is not part of the course content text but which is added text that is independent of the course content. It can appear between two paragraphs, at the end of a chapter or even near a header. The primary purpose of a non-citation link is to associate the course with a reference, e.g., a document retrieved and displayed during a search initiated in CHECKPOINT such as PPC Guides, Primary Source Materials, etc.

As discussed above, the Professional Resource and Learning System includes a rules management, reporting and filing capability. The system preferably includes a communication link to a jurisdiction, such as state accounting boards, to update rules associated with professional practice and accreditation in the respective jurisdictions. This would include the number of hours of CPE credits required annually and in other set periods as well as ethics and other requirements. This also includes a capability to facilitate approval for credit of CPE courses, such as in-house courses, put on by professional firms or accounts. Users of the system preferably include in their profile unique identifiers, such as board numbers, that have been assigned to the user by each jurisdiction, such as a state board of accountancy, in which they have been registered or granted licensure. The system uses database structures to automatically associate records of individual professionals with: completion of courses; states and other jurisdictions requiring credits; historical requirements completion; goals; etc. The system uses established and available protocols to communicate CPE related data to and from the various jurisdictions. In addition, techniques such as web scraping, web harvesting, and other data extraction methods, may be used to acquire data related to CPE compliance.

Figure 35:
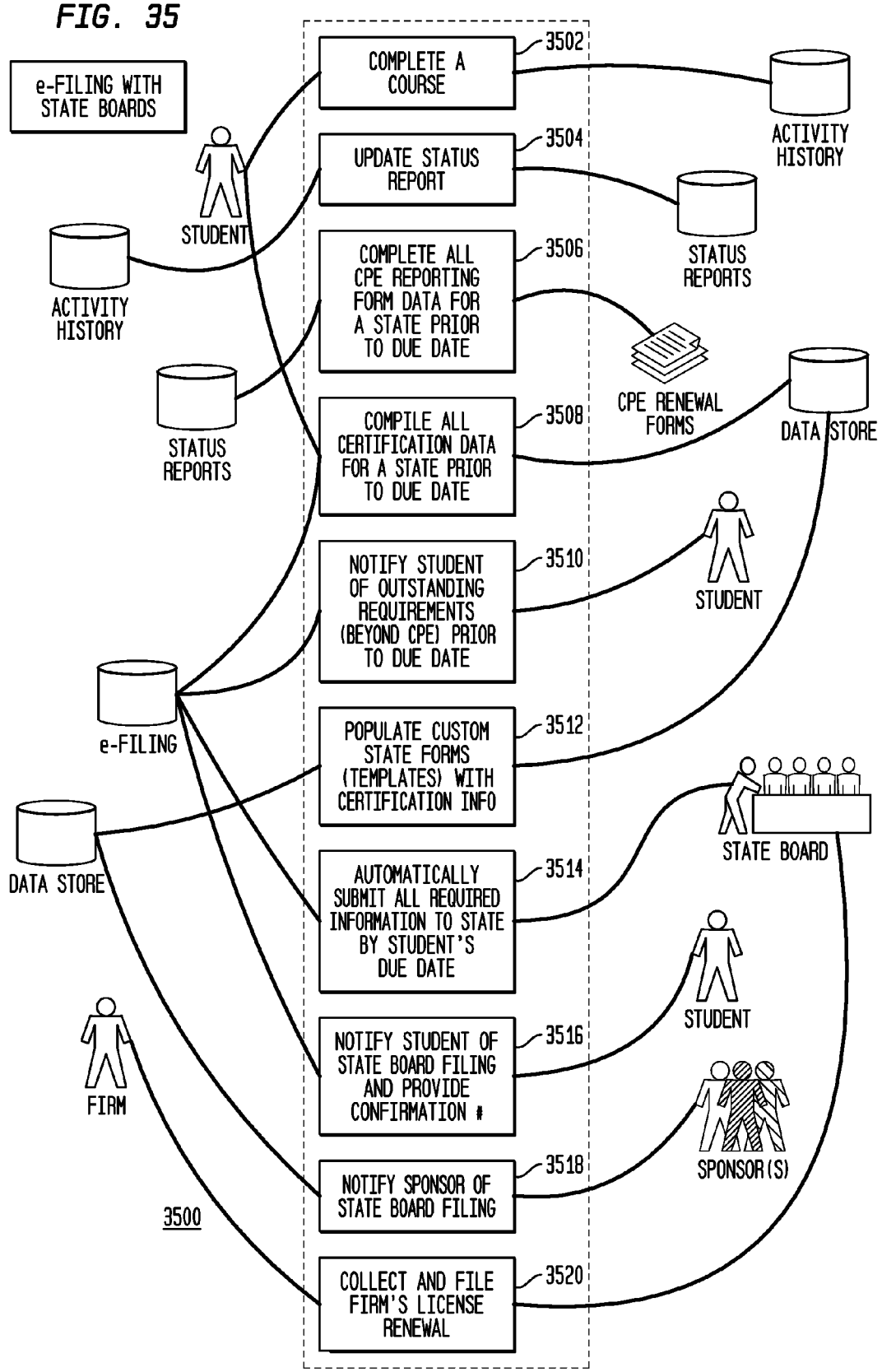
FIG. 35 is a flowchart illustrating an e-filing process associated with the integrated professional services learning system of the present invention.

FIG. 35 is a flowchart illustrating one exemplary embodiment of an automated or semi-automated CPE e-filing process for reporting completion of CPE courses to state boards in which the individual having completed the course(s) is licensed. At step 3502, a student, such as a professional and CHECKPOINT Learning subscriber, completes a CPE course for which CPE credit is given by one or more state boards, i.e., governing entity of the professional's certification(s). A database has one or more tables, columns, fields or records that are updated to reflect the event of the student completing the CPE course. In this instance, a particular software module, Activity History, records each professional's training activity and supports tracking of that training against state certifications. In this example, Activity History is used to reflect the completion and/or a change in status, e.g., completion of a course in progress.

At step 3504, the Activity History module may discretely, or automatically based on some predefined process, update the database or record to reflect the completed course for action by the Status Report module. The Status Reports module displays, e.g., via an individual's learning portal, the overall status of a professional's completed and outstanding requirements to maintain their state certification(s). At step 3506, the Status Reports module accesses database records and prints the status report data on a template that is acceptable to one or more state boards. Preferably, all CPE reporting or renewal forms are completed prior to the due date for submission of such forms. CPE renewal forms are documentation required of a professional that verify CPE compliance for the purposes of renewing their professional license in each jurisdiction in which they are licensed to practice.

With reference to Steps 3508-3516, an e-Filing module collects, schedules and distributes appropriate state filing for tax and accounting professionals and handles transactions to accomplish these goals. At step 3508, the student in conjunction with the e-Filing module inputs, captures and stores additional certification renewal information, e.g., filing date, social security number or other student ID, license number, exam completion date, and specific state renewal requirements. In the event required information is missing from a student's learning record, the system may contact the student, such as by automatically generated email message, to prompt the student to enter the needed data. At step 3510, the e-Filing component of the system notifies the student of outstanding requirements prior to or by the due date. Using data from the database, at step 3512 the system populates custom state forms (templates) with certification data or information that may include non-standardized reporting requirements that vary from state to state. At step 3514, the e-Filing module automatically submits all required information to the state board(s) on or before the student's requirements due date. At step 3516, the e-Filing module notifies the student, e.g., email generated by system or posting of notice on student's learning homepage or portal as described above, of the state board filing(s) preferably with a confirmation, tracking or some other number related to the reporting of the completion of the course and request for credit. One additional feature of the system is the capability to notify, at step 3518, the student's sponsor(s), for instance a NASBA-regulated entity providing compliant CPE education, of the completion and reporting of the CPE course. An additional higher level step 3520 allows the firm, such as through an assigned administrator, to collect information and file the firm-wide license renewal form(s).

In addition, the system may include a payment component to facilitate payment of licensure, practice or reporting related fees direct to state entities, boards or other organizations. Using a professional firm's enterprise system, the payments may be entered or tracked such as on a general ledger, which in turn may associate with the payment a tax related indicia, such as that the payment relates to a business deduction. Also, the system, e.g., as part of an in-house course creation process, may establish a communication link with one or more state boards to, for example, submit information related to a CPE course for purposes of obtaining approval for the course from the state board. This may be done on an individual basis or on course-by-course basis. Also, the system may request and obtain state board requirements related information which may then be stored in a database for use in determining individual professional action items.

The present invention is not to be limited in scope by the specific embodiments described herein, It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

What is claimed is:

1. A method of providing learning courses comprising:
receiving a first signal indicative of an entity and a product identifier associated with the entity, the entity being at least one of an individual, educational concern and business concern;
identifying a practice area associated with the entity;
based upon the practice area, automatically identifying a subset of learning courses from a database comprising a set of available learning courses, each learning course in the set of available learning courses in the database having an associated description and an associated practice area identifier, and said learning courses comprising tax professional development content;
transmitting a second signal indicative of the subset of learning courses, said subset of learning courses presented in a listing on a graphical user interface of a personalized learning portal, wherein the listing further comprises a hyperlink indicating the title of the course, a course sponsor name, a format of the course, an indication as to whether the course is entitled to any credits, and an expiration date for each learning course of the subset of earning courses;
receiving a third signal indicative of a selection of a learning course from the subset of learning courses;
in response to the third signal, incrementing a count in a counter;
automatically comparing the count to a pre-defined number associated with the product identifier, wherein the pre-defined number identifies a total number of learning courses allocated to the entity;
transmitting a fourth signal for providing the subset of learning courses for assignment to at least one participant associated with the entity if the first count does not exceed the pre-defined number;
identifying at least one of the subset of learning classes as being a mandatory class or an optional class for the at least one participant; and
allowing the at least participant to assign the at least one of the subset of learning classes to the participant if the at least one of the subset of learning classes is identified as an optional class.

2. The method of claim 1, comprising assigning the at least one participant to the at least one of the subset of learning classes if a total number of participants assigned to the at least one of the subset of learning classes does not exceed a threshold value, the threshold value associated with the at least one of the subset of learning classes.

3. The method of claim 2, wherein the threshold value is 1.

4. The method of claim 1, comprising allowing the at least one participant to be unassigned from the at least one of the subset of learning classes if the at least one of the subset of learning classes is not commenced by the at least one participant.

5. The method of claim 1, further comprising receiving a payment based on the pre-defined number associated with the product identifier.

6. The method of claim 1, wherein the learning courses are related to at least one of a tax subject matter, accounting subject matter, and combination thereof.

7. The method of claim 1, wherein the pre-defined number is time-dependent.

8. The method of claim 7, wherein upon expiration of a time period, at least one of the learning courses from the subset of learning courses is no longer available for selection.

9. The method of claim 7, wherein upon expiration of a time period, the subset of learning courses from a set of available learning courses is no longer available.

10. A educational learning system comprising:
a server including a processor and memory storing instructions that, in response to receiving a first request for access to a service, cause the processor to:
identify a practice area associated with an entity in response to receiving a first signal indicative of the entity and a product identifier associated with the entity, the entity being at least one of an individual, educational concern and business concern;
automatically identify a subset of learning courses from a database comprising a set of available learning courses based upon the practice area, each learning course in the set of available learning courses in the database having an associated description and an associated practice area identifier, said learning courses comprising tax professional development content;

transmit a second signal indicative of the subset of learning courses to a graphical user interface of a personalized learning portal, said subset of learning courses presented in a listing on the graphical user interface, wherein the listing further comprises a hyperlink indicating the title of the course, a course sponsor name, a format of the course, an indication as to whether the course is entitled to any credits, and an expiration date for each learning course of the subset of earning courses;

automatically increment a count in a counter in memory in response to receiving a third signal indicative of a selection of a learning course from the subset of learning courses, wherein the selection of the learning course is carried out by a system administrator for the entity, the selection for assignment to at least one participant associated with the entity;

automatically compare the count to a pre-defined number associated with the product identifier, wherein the pre-defined number identifies a total number of learning courses allocated to the entity;

transmit a fourth signal for providing the subset of learning courses to the at least one participant associated with the entity if the first count does not exceed the pre-defined number;

in response to receiving a second request, cause the processor to:

identify at least one of the subset of learning classes as being a mandatory class or an optional class for the participant; and allow the at least one participant to assign the at least one of the subset of learning classes to the participant if the at least one of the subset of learning classes is identified as an optional class.

11. The system of claim 10, wherein the memory stores instructions that, in response to receiving the second request, cause the processor to assign the at least one participant to the at least one of the subset of learning classes if a total number of participants assigned to the at least one of the subset of learning classes does not exceed a threshold value, the threshold value associated with the at least one of the subset of learning classes.

12. The system of claim 11, wherein the threshold value is 1.

13. The system of claim 10, wherein the memory stores instructions that, in response to receiving the second request, cause the processor to allow the at least one participant to be unassigned from the at least one of the subset of learning classes if the at least one of the subset of learning classes is not commenced by at least one participant.

14. The system of claim 10, wherein the memory stores instructions that, in response to receiving the second request, cause the processor to provide a graphical user interface for assigning the at least one participant.

15. The system of claim 10, wherein the pre-defined number is time-dependent.

16. The system of claim 15, wherein upon expiration of a time period, at least one of the learning courses from the subset of learning courses is no longer available for selection.

17. The system of claim 15, wherein upon expiration of a time period, the subset of learning courses from a set of available learning courses is no longer available.

18. The system of claim 10, wherein the learning courses are related to at least one of a tax subject matter, accounting subject matter, and combination thereof.

* * * * *